US009467991B2

(12) United States Patent
Seo et al.

(10) Patent No.: US 9,467,991 B2
(45) Date of Patent: Oct. 11, 2016

(54) METHODS AND APPARATUSES FOR TRANSMITTING AND RECEIVING DOWNLINK CONTROL CHANNEL IN WIRELESS COMMUNICATION SYSTEM

(71) Applicant: LG ELECTRONICS INC., Seoul (KR)

(72) Inventors: Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 14/359,518

(22) PCT Filed: Nov. 23, 2012

(86) PCT No.: PCT/KR2012/009961
§ 371 (c)(1),
(2) Date: May 20, 2014

(87) PCT Pub. No.: WO2013/077657
PCT Pub. Date: May 30, 2013

(65) Prior Publication Data
US 2014/0301346 A1  Oct. 9, 2014

Related U.S. Application Data

(60) Provisional application No. 61/563,500, filed on Nov. 23, 2011, provisional application No. 61/593,258, filed on Jan. 31, 2012, provisional application No. 61/593,835, filed on Feb. 1, 2012.

(51) Int. Cl.
H04W 72/04 (2009.01)
H04L 5/00 (2006.01)

(52) U.S. Cl.
CPC .......... H04W 72/042 (2013.01); H04L 5/0048 (2013.01); H04L 5/0053 (2013.01); H04L 5/0055 (2013.01)

(58) Field of Classification Search
CPC . H04L 5/0048; H04L 5/0053; H04L 5/0055; H04W 72/042
USPC ................... 370/252, 267, 315, 329
See application file for complete search history.

(56) References Cited

U.S. PATENT DOCUMENTS

| 8,718,662 B2 | 5/2014 | Shan et al. |
| 2010/0034312 A1* | 2/2010 | Muharemovic ..... H04L 27/2613 375/267 |
| 2010/0067445 A1* | 3/2010 | Rinne ................... H04L 5/0053 370/329 |

(Continued)

FOREIGN PATENT DOCUMENTS

| KR | 10-2011-0108289 A | 10/2011 |
| WO | WO 2011/103309 A2 | 8/2011 |

OTHER PUBLICATIONS

Catt et al., "Details on R-PDCCH Interleaving in LTE-A," 3GPP TSG RAN WG1 Meeting #62, Agenda Item 6.6.1, R1-104339, Aug. 23-27, 2010, Madrid, Spain, 4 pages.

(Continued)

Primary Examiner — Mark Rinehart
Assistant Examiner — Natali N Pascual Peguero
(74) Attorney, Agent, or Firm — Birch, Stewart, Kolasch & Birch, LLP

(57) ABSTRACT

The present invention relates to a wireless communication system, and more specifically, to a method and an apparatus for transceiving a downlink control channel. A method for a base station to transmit a downlink control channel in a wireless communication system according to one embodiment of the present invention comprises the steps of: selecting a resource element (RE) to which a demodulation reference signal (DMRS) is mapped; selecting an RE to which a downlink control channel is mapped; and transmitting the DMRS and the downlink control channel from the selected REs to a terminal, wherein the REs to which the downlink control channel is mapped constitute at least one resource element group (REG), and one or more REGs may be located on an orthogonal frequency division multiplex (OFDM) symbol on which the DMRS is mapped.

15 Claims, 23 Drawing Sheets

(56) References Cited

U.S. PATENT DOCUMENTS

| | | | |
|---|---|---|---|
| 2011/0075624 A1* | 3/2011 | Papasakellariou | H04L 5/0053 370/329 |
| 2012/0281554 A1* | 11/2012 | Gao | H04W 48/12 370/252 |
| 2013/0064168 A1* | 3/2013 | Song | H04L 27/2611 370/315 |
| 2013/0201926 A1* | 8/2013 | Nam | H04L 1/1685 370/329 |

OTHER PUBLICATIONS

Huawei et al., "Details of Rel-8 Based REG-level Interleaving for R-PDCCH with CRS," 3GPP TSG RAN WG1 Meeting #63, Agenda Item 6.6.2, R1-106162, Nov. 15-19, 2010, Jacksonville, Florida, USA, 3 pages.

ZTE, Details of REG-Level Interleaving and REG Size for R-PDCCH, TSG-RAN WG1 Meeting #62b, R1-105447, Oct. 11-15, 2010, Xi'an, China, 5 pages.

* cited by examiner

METHODS AND APPARATUSES FOR TRANSMITTING AND RECEIVING DOWNLINK CONTROL CHANNEL IN WIRELESS COMMUNICATION SYSTEM

CROSS REFERENCE TO THE RELATED APPLICATIONS

This application is the National Phase of PCT/KR2012/009961 filed Nov. 23, 2012, which claims priority under 35 U.S.C. §119(e) to U.S. Provisional Application No. 61/563,500 file Nov. 23, 2011, U.S. Provisional Application No. 61/593,258 filed on Jan. 31, 2012, and U.S. Provisional Application No. 61/593,835 file on Feb. 1,2012, all of which are hereby expressly incorporated by reference into the present application.

TECHNICAL FIELD

The following description relates to a wireless communication system and, more particularly, to a method and apparatus for transmitting and receiving a downlink control channel in a wireless communication system.

BACKGROUND ART

In a conventional wireless communication system, an eNB can provide scheduling information for uplink transmission and/or downlink reception of user equipment (UE) to the UE through a physical downlink control channel (PDCCH). In addition, the eNB can provide hybrid automatic repeat request acknowledgement (HARQ ACK) information on uplink transmission of the UE to the UE through a physical HARQ indicator channel (PHICH). Furthermore, the eNB can signal information about a resource region used for downlink control channel transmission to the UE through a physical control format indicator channel (PCFICH). That is, transmission of various downlink control channels in a specific resource region is defined in the conventional wireless communication system.

Current wireless communication systems require support of increased transmission capacity, improved inter-cell interference coordination, etc. Restrictions on locations of downlink control channel transmission resources in the conventional wireless communication system may not meet the above-described demands. Accordingly, introduction of a new downlink control channel, transmitted in a physical resource region different from a downlink control channel transmission region defined in the conventional wireless communication system, is under discussion.

DISCLOSURE

Technical Problem

An object of the present invention devised to solve the problem lies in a method for setting transmission resources for efficiently transmitting a new downlink control channel.

The technical problems solved by the present invention are not limited to the above technical problems and those skilled in the art may understand other technical problems from the following description.

Technical Solution

The object of the present invention can be achieved by providing a method for transmitting, by an eNB, a downlink control channel in a wireless communication system, the method including: determining a resource element (RE) to which a demodulation reference signal (DMRS) is mapped; determining REs to which a downlink control channel is mapped; and transmitting the DMRS and the downlink control channel in the determined REs to a UE, wherein the REs to which the downlink control channel is mapped constitute at least one resource element group (REG), wherein the at least one REG is located on an orthogonal frequency division multiplex (OFDM) symbol to which the DMRS is mapped.

In another embodiment of the present invention, provided herein is a method for receiving, by a UE, a downlink control channel in a wireless communication system, the method including: determining an RE to which a DMRS is mapped; determining REs to which a downlink control channel is mapped; and receiving the DMRS and the downlink control channel in the determined REs from an eNB, wherein the REs to which the downlink control channel is mapped constitute at least one REG, wherein the at least one REG is located on an OFDM symbol to which the DMRS is mapped.

In another embodiment of the present invention, provided herein is an eNB for transmitting a downlink control channel in a wireless communication system, including: a reception module; a transmission module; and a processor, wherein the processor is configured to determine an RE to which a DMRS is mapped, to determine REs to which a downlink control channel is mapped and to transmit the DMRS and the downlink control channel in the determined REs to a UE using the transmission module, wherein the REs to which the downlink control channel is mapped constitute at least one REG, wherein the at least one REG is located on an OFDM symbol to which the DMRS is mapped.

In another embodiment of the present invention, provided herein is a UE for receiving a downlink control channel in a wireless communication system, including: a reception module; a transmission module; and a processor, wherein the processor is configured to determine an RE to which a DMRS is mapped, to determine REs to which a downlink control channel is mapped and to receive the DMRS and the downlink control channel in the determined REs from an eNB, wherein the REs to which the downlink control channel is mapped constitute at least one REG, wherein the at least one REG is located on an OFDM symbol to which the DMRS is mapped.

The following may be commonly applied to the above-described embodiments of the present invention.

REs to which an additional downlink control channel other than the downlink control channel is mapped may not correspond to the OFDM symbol to which the DMRS is mapped.

The at least one REG may be composed of REs corresponding to the same subcarrier in the OFDM symbol to which the DMRS is mapped.

The REs belonging to the at least one REG may be shifted by a predetermined offset in first and second slots of a downlink subframe.

The at least one REG may be composed of REs corresponding to the same OFDM symbol.

The downlink control channel may include a first downlink control channel and a second downlink control channel.

When the first downlink control channel and the second downlink control channel are multiplexed in the same resource block pair, REs to which the second downlink control channel may be mapped are set to REs other than REs to which the first downlink control channel may be mapped.

The first downlink control channel may carry scheduling assignment information and the second downlink control channel may carry hybrid automatic repeat request (HARQ) acknowledgement information.

The first downlink control channel may be an enhanced-physical downlink control channel (E-PDCCH) and the second downlink control channel may be an enhanced-physical HARQ indicator channel (E-PHICH).

The downlink control channel may be demodulated using a channel estimated using the DMRS.

The downlink control channel may be disposed in OFDM symbols other than first N (N≤3) OFDM symbols of a downlink subframe.

The above description and the following detailed description of the present invention are exemplary and are for additional explanation of the invention disclosed in the claims.

Advantageous Effects

According to the present invention, it is possible to provide a method for setting transmission resources for efficiently transmitting a new downlink control channel.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
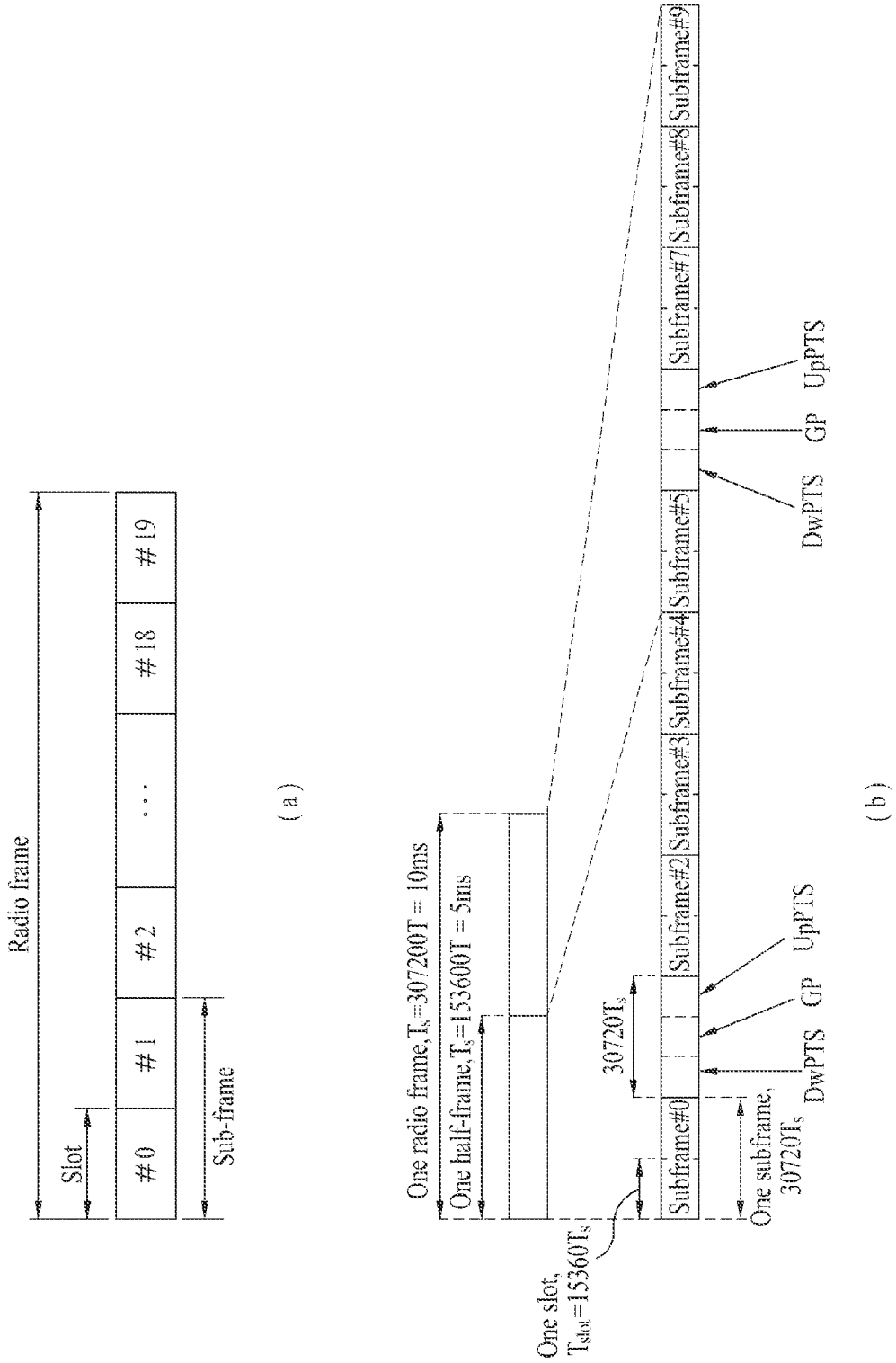
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a radio frame structure of 3GPP LTE with reference to FIG. 1.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 1(a) illustrates a type-1 radio frame structure. A downlink radio frame includes 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 2:
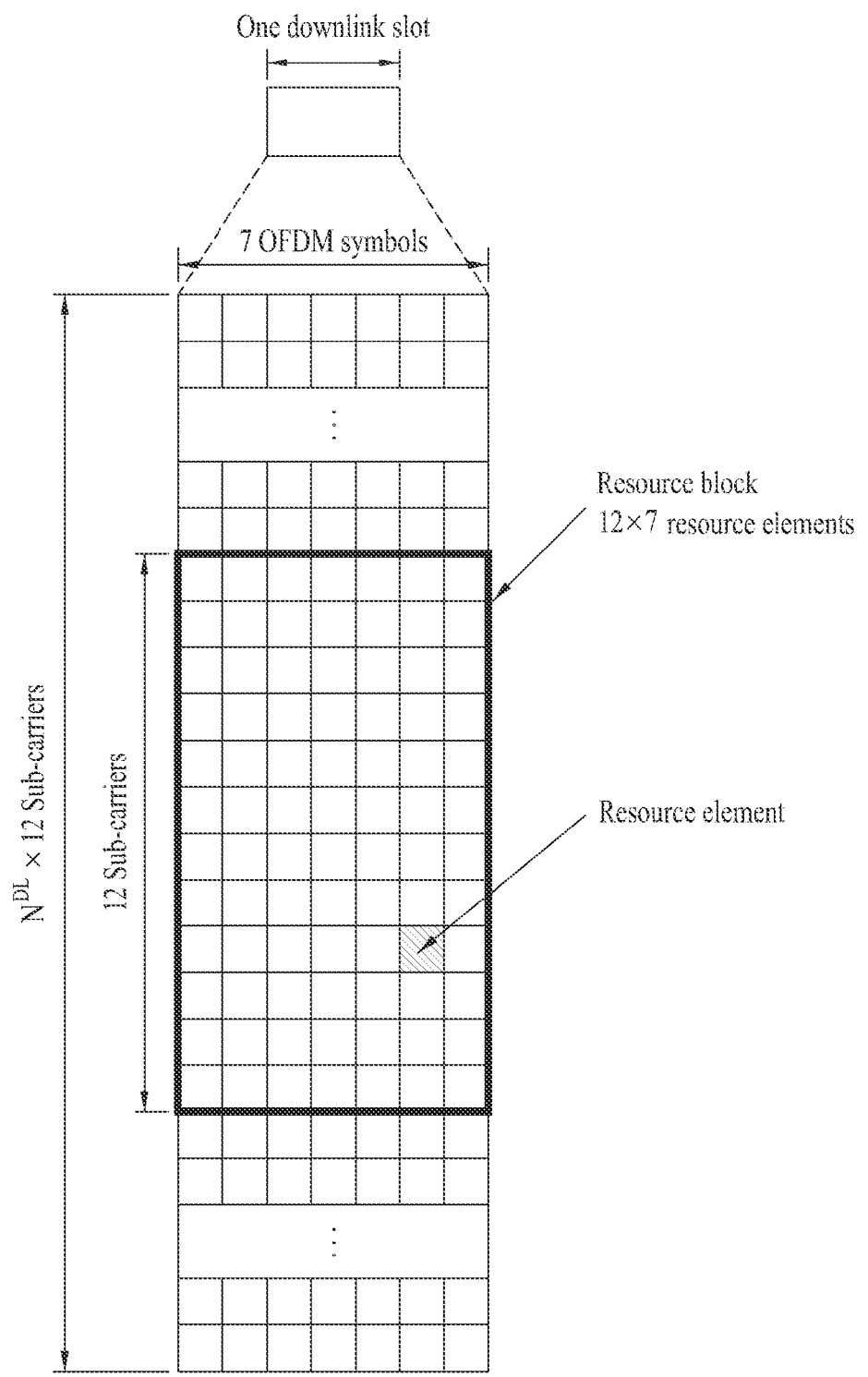
FIG. 2 illustrates a resource grid.

FIG. 2 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 3:
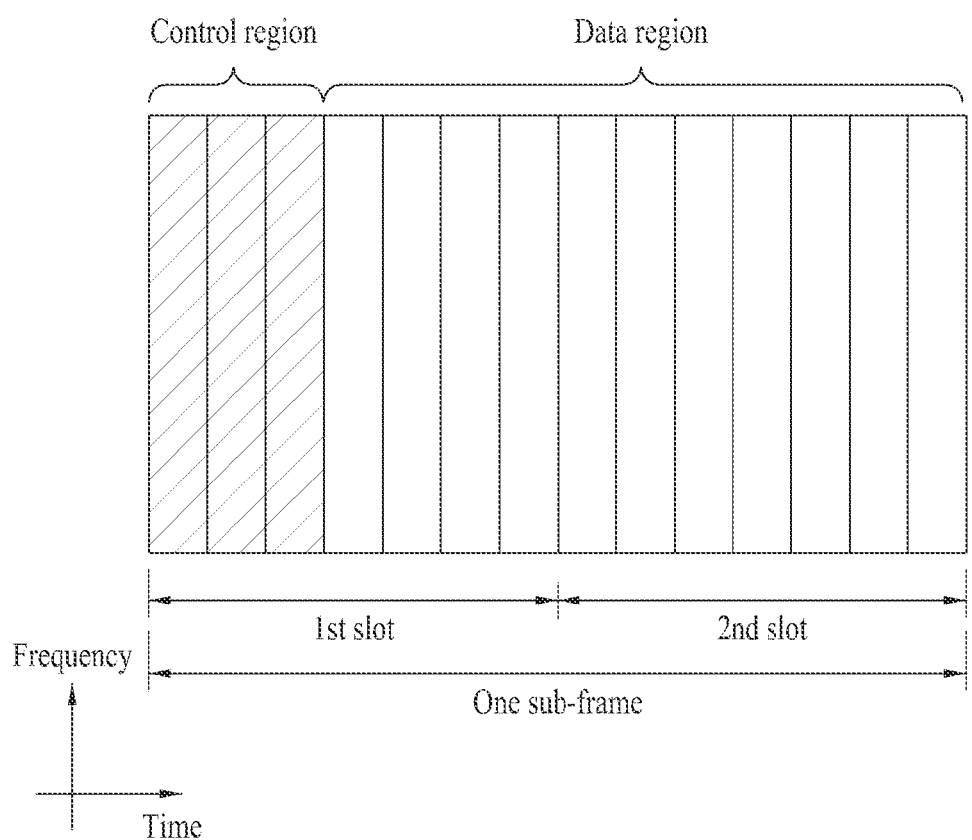
FIG. 3 illustrates a downlink subframe structure.

FIG. 3 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 4:
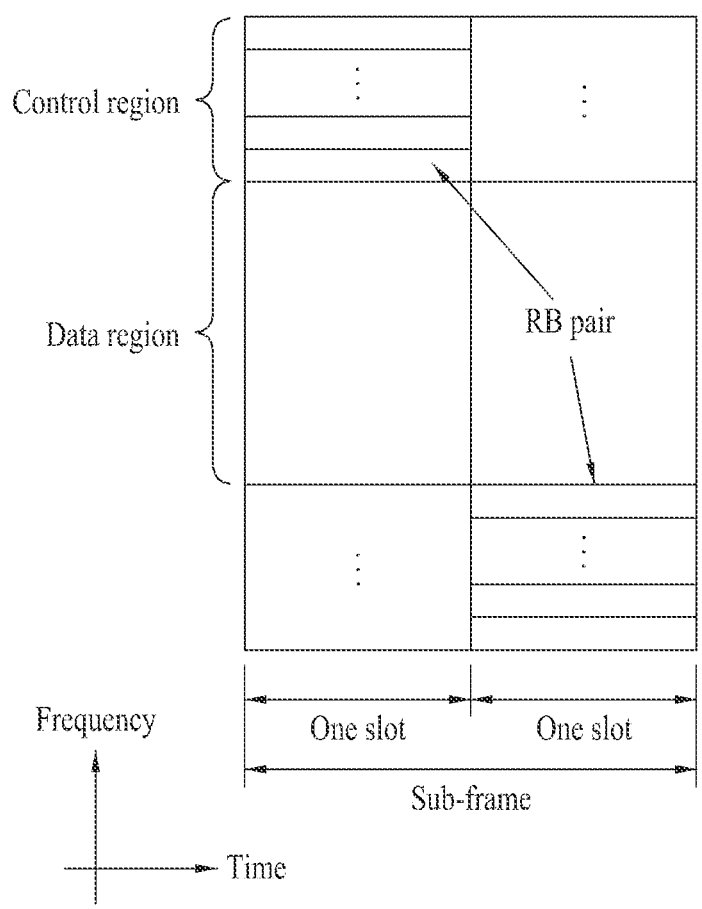
FIG. 4 illustrates an uplink subframe structure.

FIG. 4 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

Reference Signal (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal.

When multiple antennas are used to transmit and receive data, a correct signal can be received only when channel state between each Tx antenna and each Rx antenna is detected. Accordingly, a reference signal is required for each Tx antenna.

A downlink reference signal defines a common reference signal (CRS) shared by all UEs in a cell and a dedicated reference signal (DRS) dedicated to a specific UE. Information for channel estimation and demodulation can be provided according to these reference signals.

A receiver (UE) can estimate channel state from the CRS and feed back an indicator related to channel quality, such as a channel quality indicator (CQI), a precoding matrix index (PMI) and/or a rank indicator (RI), to a transmitter (eNB). The CRS may be called a cell-specific reference signal. An RS related to feedback of channel state information (CSI) such as CQI/PMI/RI may be defined as a CSI-RS.

The DRS can be transmitted through a corresponding RE when data demodulation is needed. Presence or absence of the DRS may be signaled to the UE by a higher layer. In addition, the fact that the DRS is valid only when a corresponding PDSCH is mapped may be signaled to the UE. The DRS may be called a UE-specific reference signal or a demodulation reference signal (DMRS).

Figure 5:
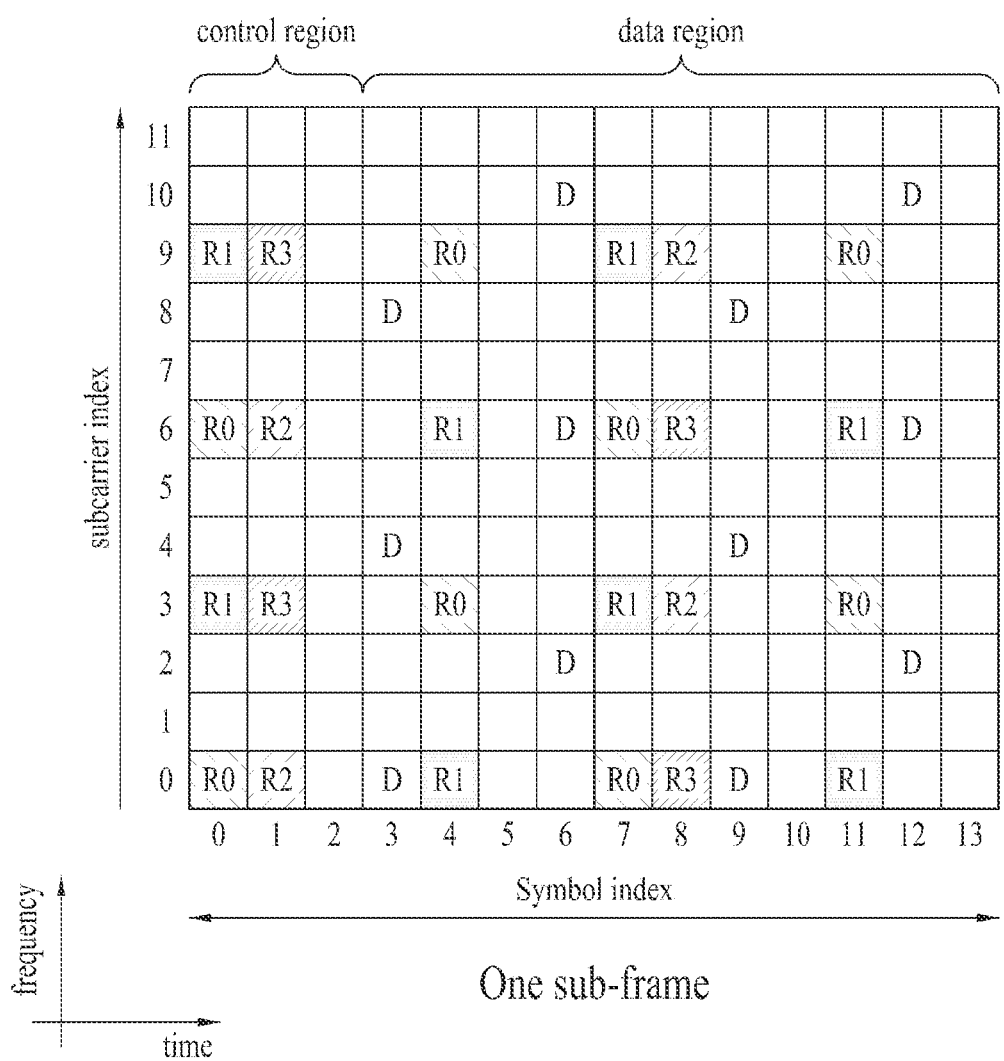
FIG. 5 illustrates a downlink reference signal.

FIG. 5 illustrates a pattern of mapping a CRS and a DRS defined in 3GPP LTE (e.g. release-8) to a downlink resource block (RB) pair. A downlink RB pair as a reference signal mapping unit may be represented as one subframe in the time domain×12 subcarriers in the frequency domain. That is, an RB pair has a length of 14 OFDM symbols in the case of normal CP and has a length of 12 OFDM symbols in the case of extended CP. FIG. 5 shows RB pairs in the case of normal CP.

FIG. 5 shows RS positions in RB pairs in a system in which an eNB supports 4 transmit antennas. In FIG. 5, REs indicated by 'R0', 'R1', 'R2' and 'R3' respectively represent CRS positions with respect to antenna port indices 0, 1, 2 and 3. An RE indicated by 'ID' represents a DRS position.

CRSs will be described in detail hereinafter.

The CRS is used to estimate a channel of a physical antenna and can be commonly received by all UEs in a cell. The CRS is distributed in the entire band. The CRS can be used for CSI acquisition and data demodulation.

The CRS is defined in various forms according to antenna configuration of a transmitter (eNB). 3GPP LTE (e.g. release-8) supports various antenna configurations and a downlink signal transmitter (eNB) may have three antenna configurations of a single antenna, 2 Tx antennas and 4 Tx antennas. When the eNB performs single antenna transmission, an RS for a single antenna port is provided. When the eNB performs 2-antenna transmission, RSs for 2 antenna ports are provided through time division multiplexing (TDM) and/or frequency division multiplexing (FDM). That is, the ROSs for the 2 antenna ports can be discriminated from each other by being present in different time resources and/or different frequency resources. Furthermore, when the eNB performs 4-antenna transmission, RSs for 4 antenna ports are provided through TDM/FDM. Channel information estimated by a signal receiver (UE) using the CRS can be used to demodulate data transmitted through single antenna transmission, transmit diversity, closed-loop spatial multiplexing, open-loop spatial multiplexing, multi-user MIMO (MU-MIMO), etc.

In case of multi-antenna transmission, when an RS is transmitted through a specific antenna port, the RS is transmitted in an RE designated according to RS pattern and no signal is transmitted in REs designated for other antenna ports.

A rule of mapping the CRS to an RB conforms to Equation 12.

$$k = 6m + (v + v_{shift}) \bmod 6$$ [Equation 1]

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k is a subcarrier index, l is a symbol index, p is an antenna port index. In addition, $N_{symb}^{DL}$ denotes the number of OFDM symbols of a downlink slot, $N_{RB}^{DL}$ denotes the number of RBs allocated to downlink, $n_s$ is a slot index, $N_{ID}^{cell}$ is a cell ID and mod denotes modulo operation. An RS position in the frequency domain depends on $V_{shift}$. Since $V_{shift}$ depends on cell ID, the RS position has different frequency shift values per cell.

Specifically, to improve channel estimation performance through the CRS, a CRS position in the frequency domain is shifted per cell such that cells have different frequency shift values. For example, when an RS is present for every 3 subcarriers, the RS can be present in a subcarrier 3k in a cell and in a subcarrier 3k+1 in another cell. For an antenna port, an RS is distributed at an interval of 6 REs (i.e. 6 subcarriers) in the frequency domain and spaced apart from REs in which an RS for another antenna port is present in the frequency domain.

Power boosting may be applied to the CRS. Power boosting is a method for transmitting an RS with higher power using power corresponding to REs of an OFDM symbol, other than REs allocated for the RS.

An RS is disposed at a specific interval starting from symbol index (l) 0 of each slot in the time domain. The interval is defined based on CP length. RSs are present in symbols corresponding to symbol indices 0 and 4 in a slot in the case of normal CP and present in symbols corresponding to symbol indices 0 and 3 in the slot in the case of extended CP. Only RSs for up to 2 antenna ports are defined in a single OFDM symbol. Accordingly, in the case of 4-Tx antenna transmission, RSs for antenna ports 0 and 1 are present in symbols corresponding to symbol indices 0 and 4 (symbol indices 0 and 3 in the extended CP case) in a slot and RSs for antenna ports 2 and 3 are present in a symbol corresponding to symbol index 1 in the slot. However, the frequencies of the RSs for antenna ports 2 and 3 are switched in the second slot.

A DRS will now be described in detail hereinafter.

The DRS (or UE-specific RS) is used for data demodulation. A precoding weight used for a specific UE is used for an RS in multi-antenna transmission such that the UE can estimate an equivalent channel obtained by combining the precoding weight transmitted through each Tx antenna and a transport channel when receiving the RS.

3GPP LTE (e.g. release-8) supports transmission through up to 4 Tx antennas and defines a DRS for rank-1 beamforming. The DRS for rank-1 beamforming is also used as an RS for antenna port index 5. A rule of mapping the DRS to an RB conforms to Equation 2. Equation 2 relates to the normal CP case.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

In Equation 2, k is a subcarrier index, l is a symbol index, p is an antenna port index. In addition, $N_{SC}^{RB}$ denotes an RB size in the frequency domain and is represented by the number of subcarriers, $n_{PRB}$ denotes a PRB number, $N_{RB}^{PDSCH}$ denotes the bandwidth of an RB in which a corresponding PDSCH is transmitted, $n_s$ is a slot index, $N_{ID}^{cell}$ is a cell ID and mod denotes modulo operation. An RS position in the frequency domain depends on $V_{shift}$. Since $V_{shift}$ depends on cell ID, the RS position has different frequency shift values per cell.

LTE-A, the next generation of 3GPP LTE, considers MIMO, multi-cell transmission, enhanced MU-MIMO, etc. of a high order and also considers DRS based data demodulation in order to support efficient RS operation and an improved transmission scheme. That is, a DRS for two or more layers can be defined to support data transmission through an added antenna, separately from the DRS (antenna port index 5) for rank-1 beamforming, defined in 3GPP LTE (e.g. release-8).

Figure 6:
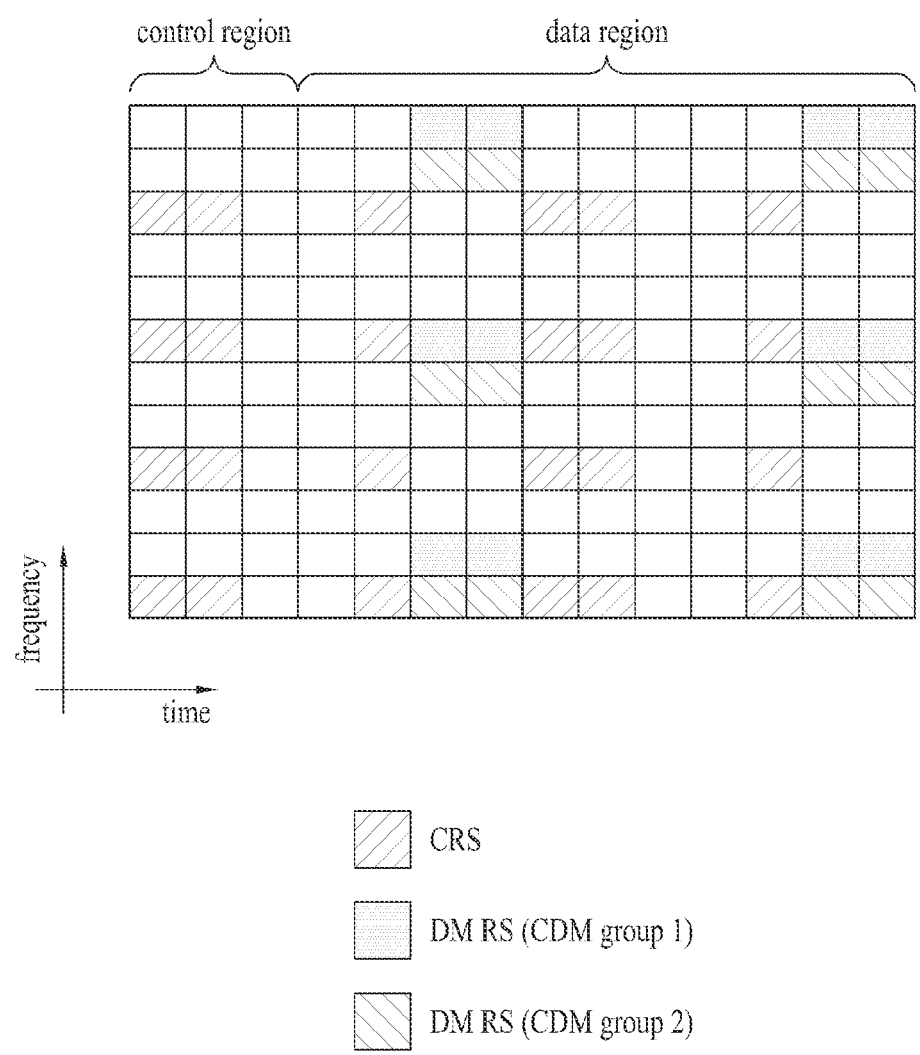
FIG. 6 illustrates an exemplary DMRS pattern defined in LTE-A.

FIG. 6 illustrates an exemplary DMRS pattern defined in LTE-A.

FIG. 6 shows the position of an RE through which a DMRS is transmitted on one RB pair (14 OFDM symbols in the time domain×12 subcarriers in the frequency domain in the case of normal CP) through which downlink data is transmitted. DMRSs can be transmitted for 8 antenna ports (antenna port indices 7 to 14) additionally defined in LTE-A. DMRSs with respect to different antenna ports can be identified by being located in different frequency resources (subcarriers) and/or different time resources (OFDM symbols) (i.e. multiplexed according to FDM and/or TDM). In addition, DMRSs with respect to different antenna ports, which are located in the same time-frequency resource, can be identified using an orthogonal code (i.e. multiplexed according to CDM).

In an enhanced wireless communication system (e.g. LTE-A), an additional reference signal (CSI-RS) for measurement of channel state information (CSI) for a new antenna port is defined.

Figure 7:
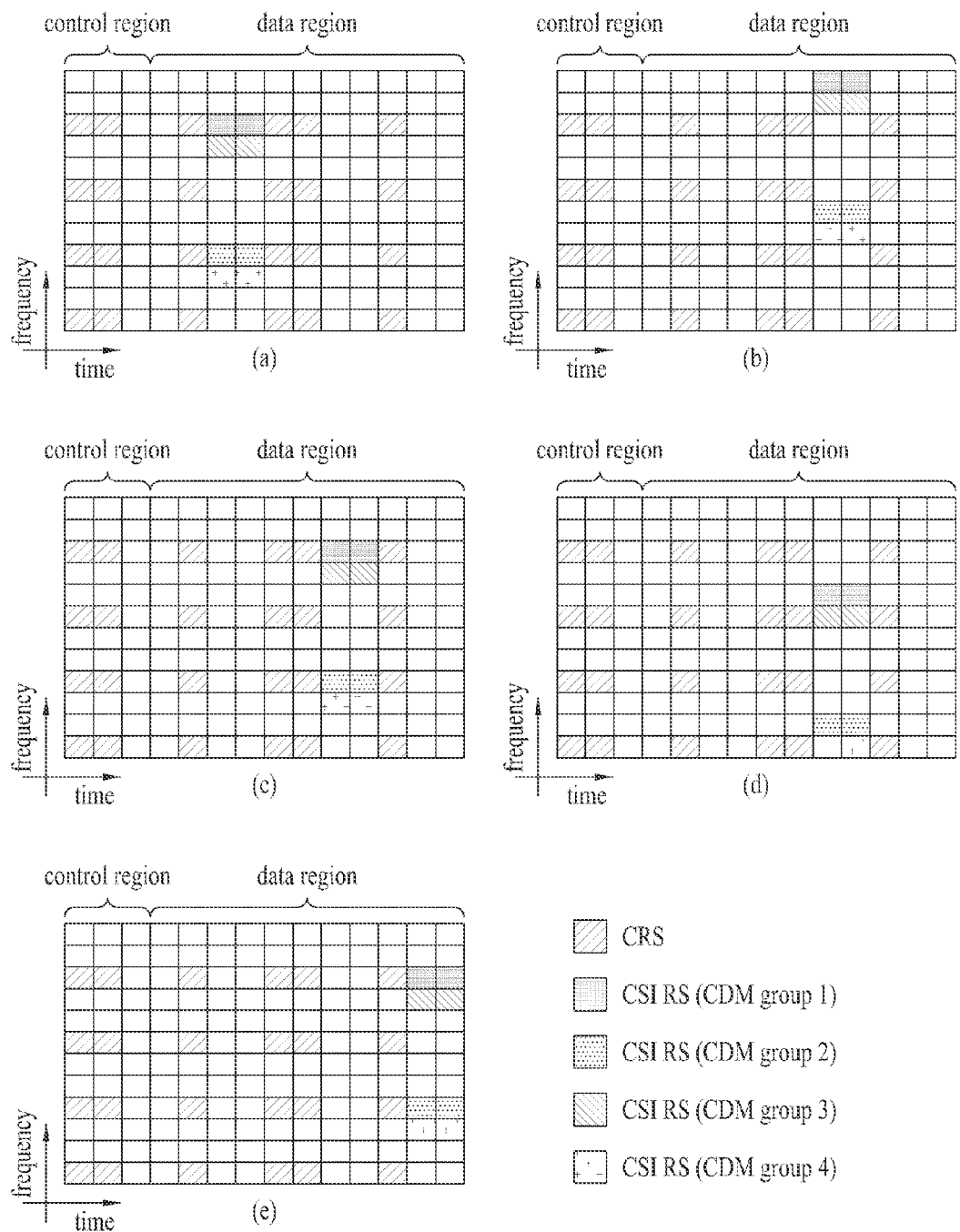
FIG. 7 illustrates exemplary CSI-RS patterns defined in LTE-A.

FIG. 7 illustrates exemplary CSI-RS patterns defined in LTE-A. FIG. 7 shows positions of REs on which CSI-RSs are transmitted on one RB pair (14 OFDM symbols in the time domain ×12 subcarriers in the frequency domain in the case of normal CP) through which downlink data is transmitted. One of CSI-RS patterns of FIGS. 7(*a*) to 7(*e*) can be used in a downlink subframe. CSI-RSs can be transmitted for 8 antenna ports (antenna port indices 15 to 22) additionally defined in LTE-A. CSI-RSs with respect to different antenna ports can be identified by being located in different frequency resources (subcarriers) and/or different time resources (OFDM symbols) (that is, multiplexed according to FDM and/or TDM). In addition, CSI-RSs with respect to different antenna ports, which are located in the same time-frequency resource, can be identified using an orthogonal code (i.e. multiplexed according to CDM). In FIG. 7(*a*), CSI-RSs with respect to antenna ports #15 and #16 can be located in REs represented as CSI-RS CDM group 1 and can be multiplexed using an orthogonal code. In addition, CSI-RSs with respect to antenna ports #17 and #18 can be located in REs represented as CSI-RS CDM group 2 and can be multiplexed using an orthogonal code. CSI-RSs with respect to antenna ports #19 and #20 can be located in REs represented as CSI-RS CDM group 3 and can be multiplexed using an orthogonal code. CSI-RSs with respect to antenna ports #21 and #22 can be located in REs represented as CSI-RS CDM group 4 and can be multiplexed using an orthogonal code. The principle described with reference to FIG. 7(*a*) can be equally applied to FIGS. 7(*b*) to 7(*e*).

RS patterns shown in FIGS. 5, 6 and 7 are exemplary and various embodiments of the present invention are not limited to specific RS patterns. That is, various embodiments of the present invention can be equally applied to a case in which an RS pattern different from those of FIGS. 5, 6 and 7 is defined and used.

PDCCH Processing

When PDCCHs are mapped to REs, control channel elements (CCEs) corresponding to contiguous logical allocation units, are used. A CCE includes a plurality of REGs (e.g. 9) and an REG includes 4 neighboring REs except for an RS.

The number of CCEs necessary for a specific PDCCH depends on a DCI payload corresponding to control information size, cell bandwidth, channel coding rate, etc. Specifically, the number of CCEs for a specific PDCCH can be determined based on the PDCCH format shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if the UE decodes all CCEs that can be used for downlink for each PDCCH format, a search space is defined in consideration of limitation on a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 2.

TABLE 2

| Search space | | | Number of PDCCH |
|---|---|---|---|
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown Table 2, the UE has a plurality of search spaces at each aggregation level because 4 aggregation levels are present. The search spaces may be divided into a UE-specific search space and a common search space, as shown in Table 2. The UE-specific search space is for a specific UE. Each UE may check an RNTI and CRC, which mask a PDCCH, by monitoring a UE-specific search space thereof (attempting to decode a PDCCH candidate set according to an available DCI format) and acquire control information when the RNTI and CRC are valid.

The common search space is used when a plurality of UEs or all UEs need to receive PDCCHs, for system information dynamic scheduling or paging messages, for example. The common search space may be used for a specific UE for resource management. Furthermore, the common search space may overlap with the UE-specific search space.

The UE attempts to decode a search space, as described above. The number of decoding attempts is determined by DCI format and transmission mode determined through RRC signaling. When carrier aggregation is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation is not applied.

Enhanced Control Channel

A description will be given of an enhanced-PDCCH (E-PDCCH) as an exemplary enhanced control channel.

While control information included in the aforementioned DCI formats is transmitted on the PDCCH defined in LTE/LTE-A in the above description, the control information is applicable to downlink control channels other than the PDCCH, for example, the E-PDCCH. The E-PDCCH corresponds to a control channel in a new format which carries DCI for scheduling allocation for UEs and can be introduced to effectively support inter-cell interference coordination (ICIC), multi-node system, CoMP (coordinated multi-point), MU-MIMO, etc.

The E-PDCCH is discriminated from the PDCCH in that the E-PDCCH is allocated to a time-frequency resource region (e.g. data region of FIG. 3) other than a region (e.g. control region of FIG. 3) defined for PDCCH transmission in LTE/LTE-A (the PDCCH is referred to as a legacy PDCCH to be discriminated from the E-PDCCH hereinafter). For example, mapping of the E-PDCCH to REs can be represented as mapping to OFDM symbols other than first N (N≤3) OFDM symbols of a downlink subframe in the time domain and mapping to a set of semi-statically allocated resource blocks (RBs) in the frequency domain.

An E-PHICH may be defined as a new control channel carrying HARQ ACK/NACK information about uplink transmission and an E-PCFICH may be defined as a new control channel carrying information about a resource region used for downlink control channel transmission. The E-PDCCH, E-PHICH and/or E-PCFICH may be commonly referred to as an enhanced control channel.

An enhanced REG (EREG) may be used to define mapping of enhanced control channels to resource elements. For example, 16 EREGs (i.e. EREG 0 to EREG 15) may be provided for one physical resource block (PRB) pair. REs other than REs to which DMRSs are mapped in one PRB are numbered 0 to 15. The numbering order conforms to frequency increasing order and then to time increasing order. For example, REs numbered i constitute one E-REG i.

An enhanced control channel may be transmitted using an aggregate of one or more ECCEs. Each ECCE may include one or multiple EREGs. The number of EREGs per ECCE can be 4 or 8, for example (4 in the case of a normal subframe of normal CP).

ECCEs available for the enhanced control channel may be numbered 0 to $N_{ECCE}-1$. $N_{ECCE}$ may be 1, 2, 4, 8, 16 or 32.

The number of REs corresponding to a PRB pair set for enhanced control channel transmission may be defined as the number of REs satisfying the following conditions, that is, i) the REs should belong to one of 16 EREGs of the PRB pair, ii) the REs should not be used for a CRS or CSI-RS and iii) the REs should belong to OFDM symbols having indices greater than the index of the OFDM symbol at which the enhanced control channel is started.

In addition, the enhanced control channel may be mapped to REs according to the localized or distributed method, as described above. The enhanced control channel may be mapped to REs satisfying the following conditions, that is, a) the REs should belong to an EREG allocated for transmission, b) the REs should not belong to a PRB pair used to transmit a physical broadcast channel (PBCH) or a synchronization signal, c) the REs should not be used for a CRS or a CSI-RS for a specific UE and d) the REs should belong to OFDM symbols having indices greater than the index of the OFDM symbol at which the enhanced control channel is started.

Allocation of the enhanced control channel can be performed as follows. One or multiple enhanced control channel-PRB-sets may be configured for a UE through higher layer signaling from an eNB. For example, enhanced control channel-PRB-sets may be provided for monitoring.

Resource Mapping Scheme for Enhanced Control Channels

The present invention proposes an effective resource mapping method for the enhanced control channel. While the principle of the present invention will be described for the E-PDCCH as a representative of enhanced control channels in the following, the present invention is not limited thereto and the principle of the present invention can be equally applied to mapping of enhanced control channels such as the E-PHICH and/or E-PCHICH to resources.

Figure 8:
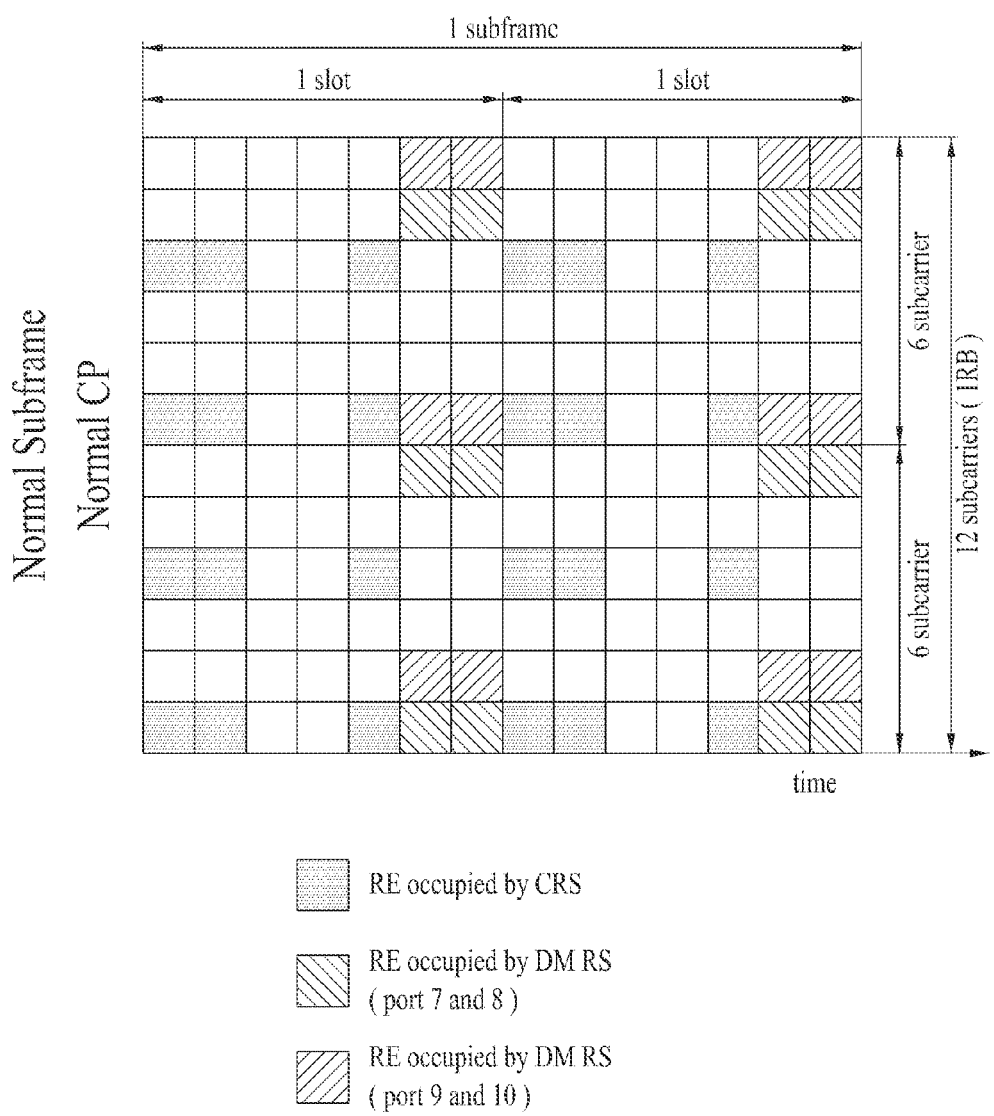
FIG. 8 illustrates positions of DMRSs for E-PDCCH demodulation in an LTE system using a normal CP.

The E-PDCCH may be designed to obtain precoding effect using DMRS ports 7 to 14. FIG. 8 illustrates positions of DMRSs for E-PDCCH demodulation in an LTE system using a normal CP. Referring to FIG. 8, it can be known that DMRSs that can be used for E-PDCCH demodulation are concentrated on specific OFDM symbols. In FIG. 8, when the index of the first OFDM symbol is 0, DMRSs are mapped to OFDM indexes 5, 6, 12 and 13. Positions of CRSs and DMRSs, shown in FIG. 8, are exemplary and may be changed according to CRS port number, whether an MBSFN (Multicast-Broadcast Single Frequency Network) subframe is configured (channels or signals other than a CRS may not mapped in a data region in a downlink subframe set as an MBSFN, for example, and even the CRS may not present in the data region), the number of a used DMRS port, etc.

In addition, while the numbers of 4 DMRS ports for E-PDCCH demodulation are represented by 7, 8, 9 and 10 in FIG. 8, this is exemplary and the number of DMRSs and/or DMRS port numbers for E-PDCCH demodulation may differ from the number of DMRSs and/or DMRS port numbers for PDSCH demodulation. Since one PRB pair includes too many REs to transmit only one E-PDCCH, plural E-PDCCHs are preferably multiplexed in one PRB pair. Plural E-PDCCHs may be different DCI messages transmitted to the same UE or E-PDCCHs transmitted to different UEs.

A channel estimated using a DMRS for an RE through which the DMRS is transmitted may be used to estimate a channel of a neighbor RE. That is, an RE closer to a DMRS RE may have a channel more similar to a channel estimated through the corresponding DMRS and accuracy of estimation of the channel of the RE increases with decreasing distance to the DMRS RE. Since DMRSs are concentrated and transmitted on specific OFDM symbols, as described above, correct channel estimation in REs corresponding to the specific OFDM symbols or neighbor OFDM symbols can be performed. Particularly, when a channel corresponding to an OFDM symbol considerably changes, compared to a channel corresponding to a neighbor OFDM symbol, due to high mobility of a UE, an RE closer to a DMRS RE is preferably allocated to the UE. When a channel variation between OFDM symbols is not considerable because of low mobility of the UE, it is possible to expect a satisfactory channel estimation result even though an RE at a distance from the DMRS RE is allocated to the UE.

The present invention proposes a method for allocating a specific E-PDCCH to DMRS transmission OFDM symbols in mapping of the E-PDCCH to resource elements. Accordingly, E-PDCCH transmission in consideration of UE mobility or channel estimation performance can be appropriately performed.

For example, REs that can be used for E-PDCCH transmission, which are included in one PRB pair, can be divided into a plurality of subsets and only some of the subsets can occupy REs on DMRS transmission OFDM symbols. For example, REs corresponding to DMRS transmission OFDM symbols (OFDM symbols 5 and 6 and/or 12 and 13 in the case of normal CP) can be primarily allocated to some of the subsets and REs corresponding to OFDM symbols other than the DMRS transmission OFDM symbols can be primarily allocated to the remaining subsets. While REs that can be used for E-PDCCH transmission, which are included in one PRB pair, are divided into 4 subsets (i.e. 4 E-PDCCH RE subsets) in the following description for clarity, the present invention is not limited thereto and the principle of the present invention can be equally applied to a case in which the REs are divided into a different number of subsets, for example, 2, 3 or 5 subsets.

Figure 9:
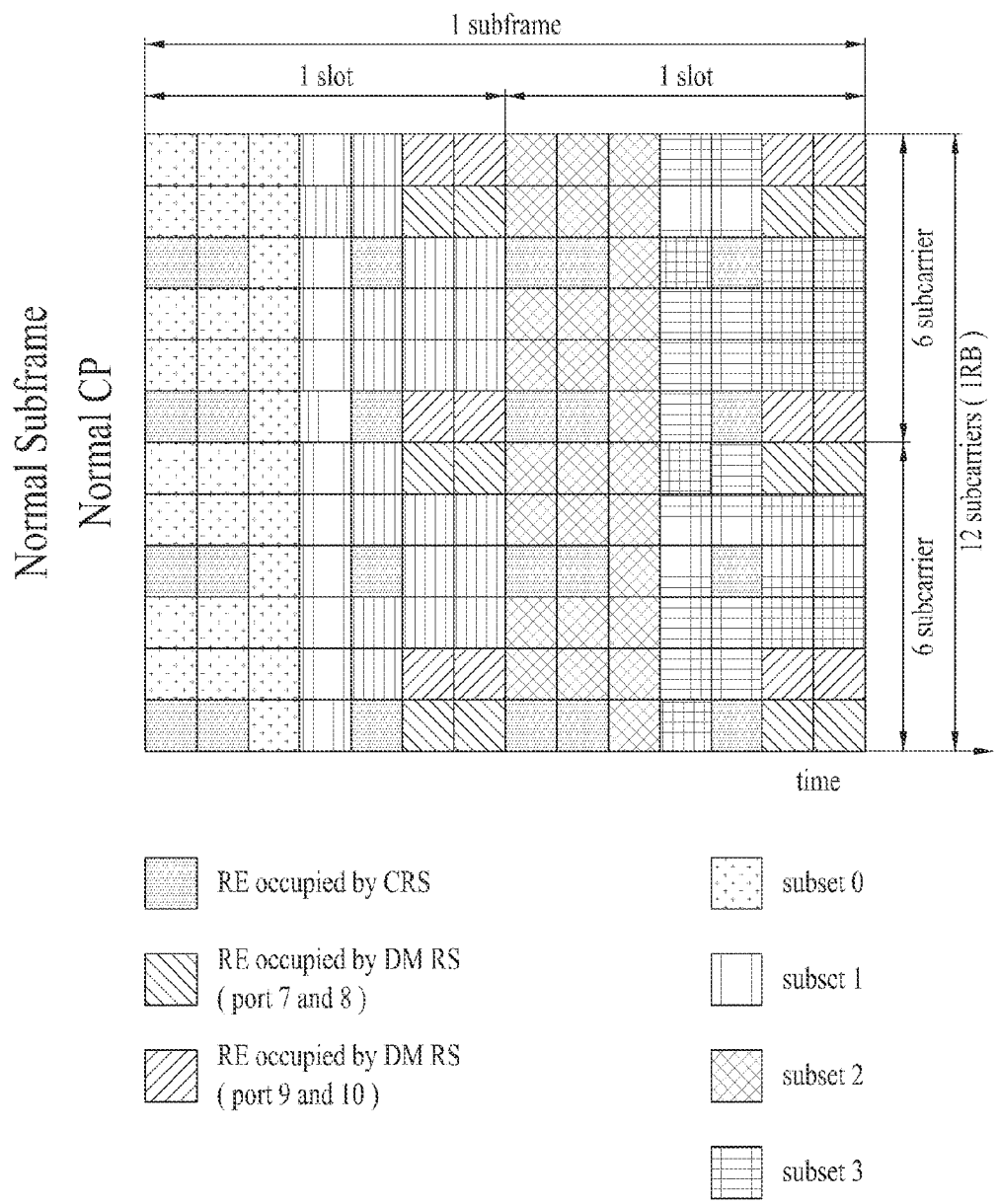
FIGS. 9 to 15 illustrate examples of E-PDCCH resource mapping according to the present invention.

FIG. 9 illustrates E-PDCCH resource mapping according to an embodiment of the present invention.

FIG. 9 shows a method of separating 4 E-PDCCH RE subsets (i.e. subsets 0 to 3) in one PRB pair at the OFDM symbol level. For example, OFDM symbols 0 to 2 can be allocated to subset 0, OFDM symbols 3 to 6 can be allocated to subset 1, OFDM symbols 7 to 9 can be allocated to subset 2 and OFDM symbols 10 to 13 can be allocated to subset 3. In this case, it can be considered that subsets 0 and 2 are located at a distance from DMRS transmission OFDM symbols, an eNB can allocate subsets 0 and 2 to a UE having low mobility. In addition, subsets 1 and 3 can be considered to correspond to DMRS transmission symbols or OFDM symbols close thereto, and thus the eNB can allocate subsets 1 and 3 to a UE having high mobility.

Particularly, for a UE having high mobility, it is possible to distribute one E-PDCCH to different PRBs and transmit the E-PDCCH through the PRBs. For example, one E-PDCCH can be divided into a plurality of REGs (each of which is composed of 4 REs, for example) and the REGs can be respectively transmitted in different PRBs. This can be referred to as E-PDCCH resource mapping to which REG based interleaving is applied. In this case, subsets (subsets 1 and 3 in the example of FIG. 9) which primarily use DMRS transmission OFDM symbols can be considered to be suitable for an E-PDCCH to which REG based interleaving is applied since the subsets can improve performance of channel estimation for REGs belonging to different PRBs when allocated to the E-PDCCH.

In addition, the subsets (subsets 1 and 3 in the example of FIG. 9) which primarily use DMRS transmission OFDM symbols can be considered suitable for attempts of unspecified UEs to detect E-PDCCHs as in a common search space since a channel (i.e. precoded channel) estimated through a DMRS can be used as a channel for E-PDCCH demodulation even if information about precoding applied to E-PDCCHs is not additionally provided.

Figure 10:
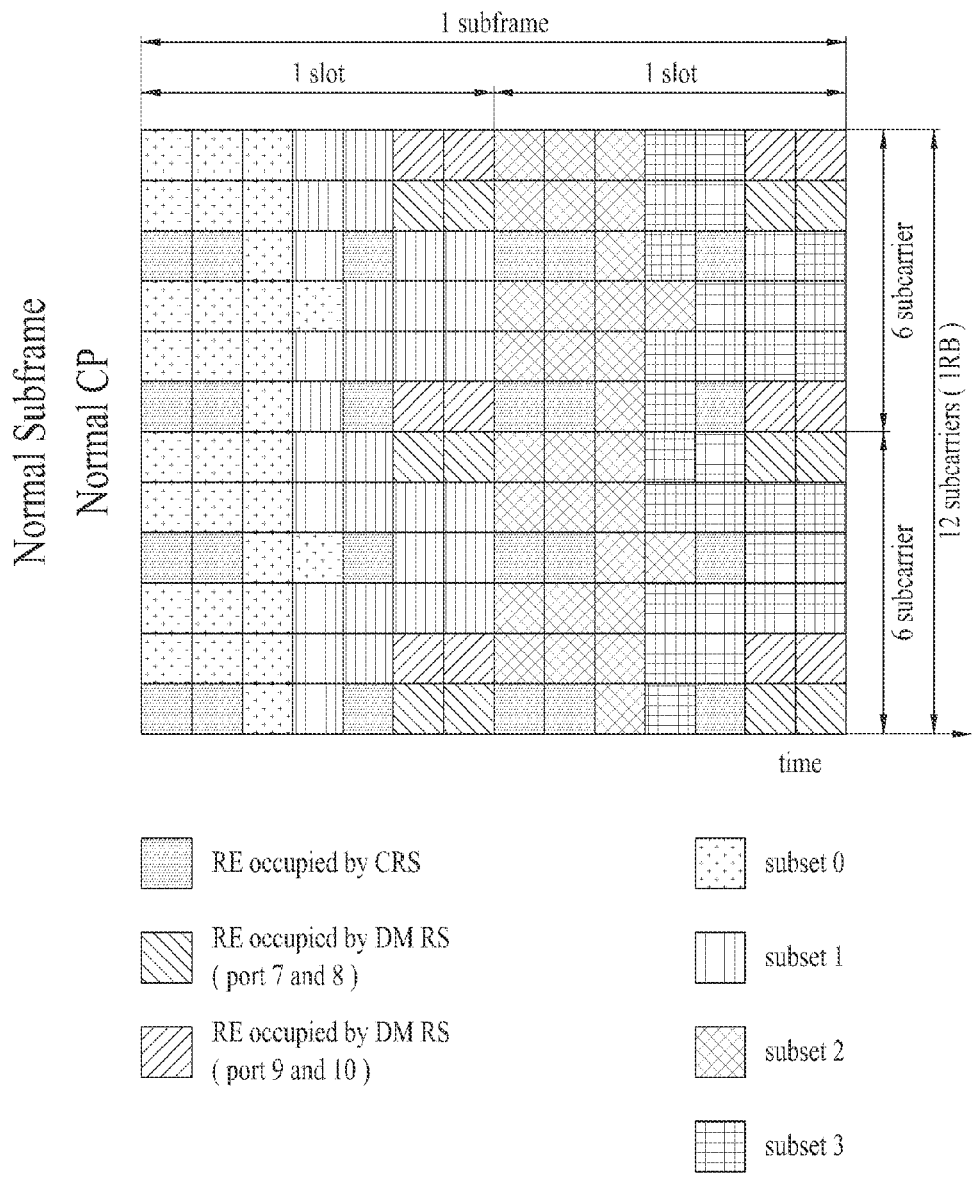

FIG. 10 illustrates E-PDCCH resource mapping according to another embodiment of the present invention.

In the example of FIG. 9, the number of REs corresponding to subsets 0 and 2 is 28 and the number of REs corresponding to subsets 1 and 3 is 32. That is, different numbers of REs are allocated to subsets.

To allocate the same number of REs to a plurality of E-PDCCH RE subsets, some REs in OFDM symbols corresponding to the boundary of two neighboring subsets may be allocated to one subset and the remaining REs may be allocated to the other subset. In the example of FIG. 10, 2 REs corresponding to OFDM symbol 3 are allocated for subset 0 and 2 REs corresponding to OFDM symbol 10 are allocated for subset 2. That is, each of 4 subsets occupies 30 REs in the example of FIG. 10.

In addition, in the example of FIG. 10, subcarrier indexes of the REs corresponding to OFDM symbol 3 and allocated to subset 0 and subcarrier indexes of the REs corresponding to OFDM symbol 10 and allocated to subset 2 are 3 and 8 (the index of the lowest subcarrier is 0). Since the REs allocated to subsets 0 and 2 in OFDM symbols 3 and 10 are farthest away from DMRS REs, the REs may have a large channel estimation error. Accordingly, for subsets 1 and 2, REs allocated to other subsets, which can tolerate low channel estimation accuracy, are most preferable.

However, the scope of the present invention is not limited to the example of FIG. 10 and includes various schemes in which REs corresponding to one OFDM symbol are divided and occupied by a plurality of subsets.

A description will be given of a method for determining DMRSs related to E-PDCCH demodulation when E-PDCCH RE subset resource mapping is performed as described above.

When one E-PDCCH RE subset is allocated to only some OFDM symbols as in the examples of FIGS. 9 and 10, it is necessary to determine how DMRSs transmitted in OFDM symbols at a distance from the corresponding OFDM symbols will be used.

For example, for subset 1 in the example of FIG. 9, information about a correctly estimated channel can be acquired only using DMRSs present in OFDM symbols 5 and 6 and E-PDCCH demodulation can be performed using the information. If the UE has high mobility, then there is high possibility that a channel estimated using DMRSs located in OFDM symbols 12 and 13 has a large error when the channel estimation value of the channel is assumed to be a channel estimation value in the REs corresponding to subset 1. Accordingly, for an E-PDCCH transmitted only on a specific FDM symbol, the E-PDCCH is demodulated using only DMRSs located in OFDM symbols included in OFDM symbols corresponding to an E-PDCCH RE subset corresponding to the E-PDCCH. For example, demodulation with respect to subset 1 can be performed using only DMRSs corresponding to OFDM symbols 5 and 6 and demodulation with respect to subset 3 can be performed using only DMRSs corresponding to OFDM symbols 12 and 13.

In addition, when a DMRS transmission RE is not included in an OFDM symbol to which a specific E-PDCCH RE belongs (e.g. subsets 0 and 2 in FIG. 9), demodulation may be performed using all DMRSs (e.g. DMRSs corresponding to OFDM symbols 5, 6, 12 and 13) within the corresponding PRB pair.

Furthermore, when modulation is performed using only DMRSs corresponding to the same OFDM symbol as a corresponding E-PDCCH RE subset, DMRSs at a distance from the OFDM symbol are not transmitted. For example, when subset 1 is demodulated using DMRSs of specific ports corresponding to OFDM symbols 5 and 6, it can be assumed that the DMRSs corresponding to the specific ports are not transmitted in OFDM symbols 12 and 13 (or the same precoding is not applied). Accordingly, the eNB can save DMRS transmission resources of the corresponding ports in OFDM symbols 12 and 13 and reuse the DMRSs of the corresponding ports for subset 3.

In addition, some E-PDCCH RE subsets may share a plurality of DMRSs. If one PRB pair is divided into 4 subsets and precoding is applied per subset in the example of FIG. 10, then DMRSs (DMRSs corresponding to antenna ports 7, 8, 9 and 10) of a total of 4 ports are needed. In this situation, if transmit diversity using multiple antennas (e.g. STBC (Space-Time Block Coding) or SFBC (Space-Frequency Block Coding)) is used for some subsets, particularly, subsets adjacent to a DMRS transmission OFDM symbol, then one subset requires two or more DMRSs and thus the number of DMRS ports necessary for all subsets may be insufficient. To solve this problem, operation may be performed such that other subsets reuse DMRSs of corresponding ports.

For example, STBC is performed using DMRSs of antenna ports 7 and 8 for subset 1 using transmit diversity. If STBC is performed for subset 3 by reusing the DMRSs of the same antenna ports, then DMRSs of antenna ports 9 and 10 can be respectively used for the remaining subsets 0 and 2. Here, if a single antenna transmission scheme instead of STBC is applied to subset 3, one of the antenna ports 7 and 8 used for subset 1 can be selected and used for subset 3.

DMRSs used for application of transmit diversity may occupy different REs in order to ensure improved orthogonality. For example, transmit diversity such as SFBC can be applied to a certain subset using DMRS ports 7 and 9 and DMRS ports 8 and 10 can be used for another subset. In addition, a DMRS may not be transmitted in order to protect a DMRS which code-division-multiplexed therewith according to resource utilization state (e.g. when the number of available REs within the corresponding subframe is less than a predetermined value) (for example, a DMRS port 8 may not be transmitted in order to protect a DMRS port 7 since the DMRSs corresponding to DMRS ports 7 and 8 are code-division-multiplexed on the same RE).

Figure 11:
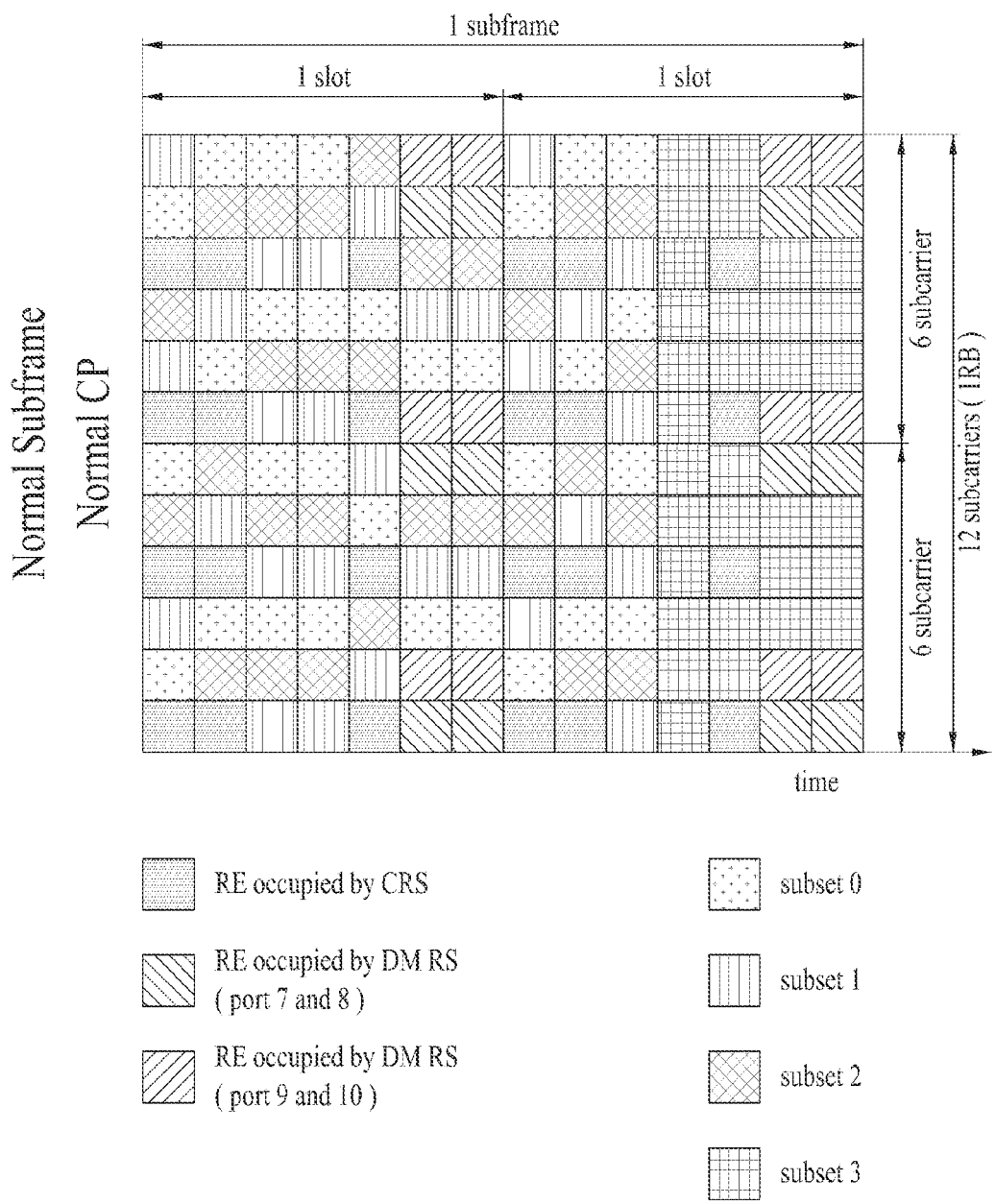

FIG. 11 illustrates E-PDCCH resource mapping according to another embodiment of the present invention.

While E-PDCCH RE subsets are divided based on OFDM symbols in the examples described with reference to FIGS. 9 and 10, this structure may be restrictively applied to a specific OFDM symbol. For example, when a single PRB pair is divided into 4 subsets, REs of OFDM symbols corresponding to DMRSs are concentrated on a specific subset, as shown in FIGS. 9 and 10, and the remaining resources are uniformly distributed among the remaining subsets.

FIG. 11 illustrates an example in which REs corresponding OFDM symbols including DMRSs of OFDM symbols 12 and 13 are allocated to subset 3 and the remaining REs, which are not allocated to subset 3, are mapped to subsets 0, 1 and 2 sequentially (in frequency increasing order and then in time increasing order). Here, subsets concentrated on the last OFDM symbol of a subframe, such as subset 3, are advantageous since DMRS transmission OFDM symbols and neighboring OFDM symbols can be allocated for E-PDCCH RE subsets irrespective of (or independently of) the number of OFDM symbols used for a legacy-PDCCH when first several OFDM symbols of the subframe are used for the legacy-PDCCH.

To provide E-PDCCH resource mapping flexibility, the eNB may signal an E-PDCCH resource mapping scheme with respect to each PRB pair to the UE through higher layer signaling. For example, information about an E-PDCCH resource mapping scheme may include information indicating whether a specific E-PDCCH RE subset is disposed on a specific OFDM symbol only. In addition, the information about an E-PDCCH resource mapping scheme may include information indicating whether an E-PDCCH RE subset to which only last several OFDM symbols are allocated is present.

Figure 12:
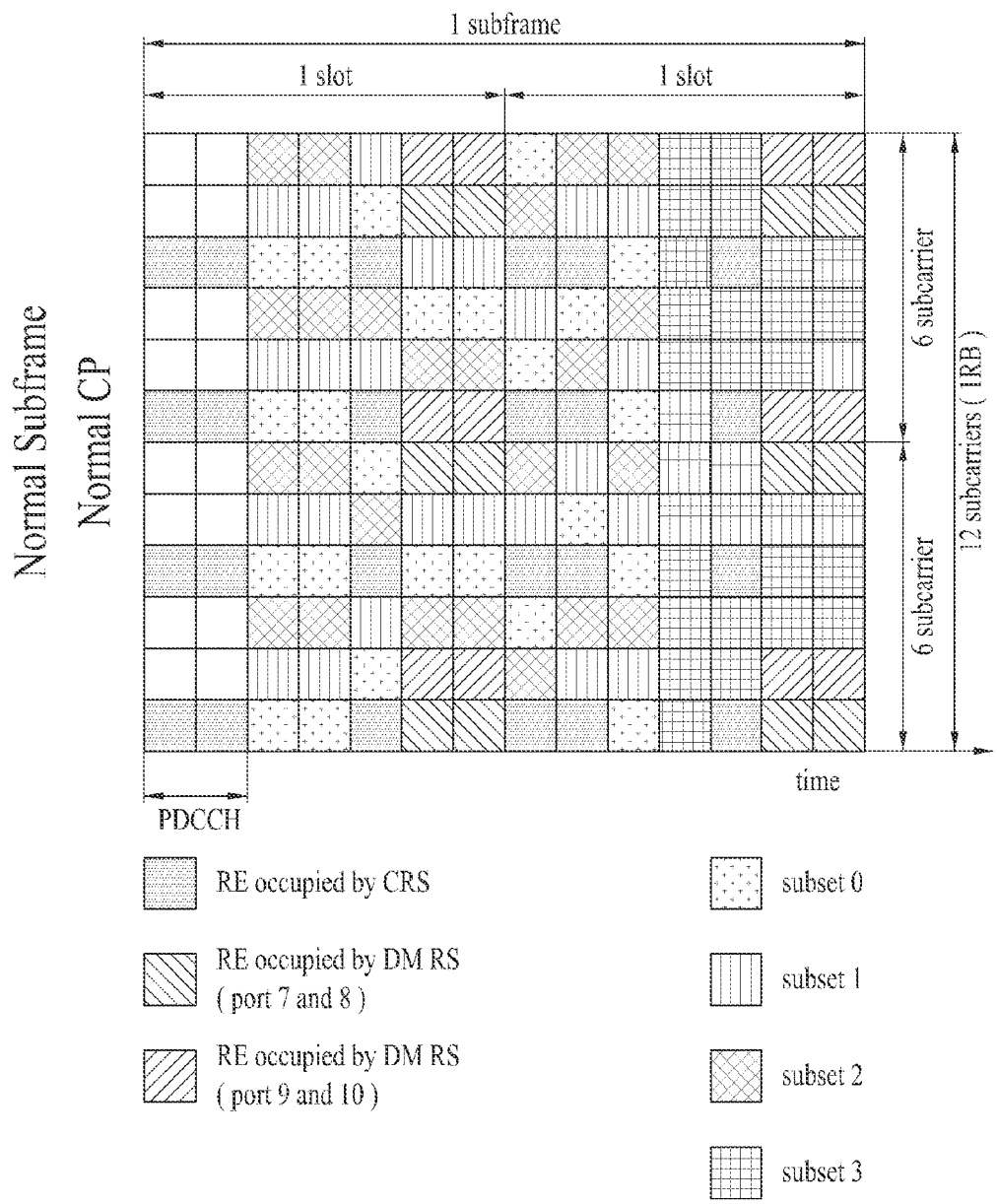
Figure 13:
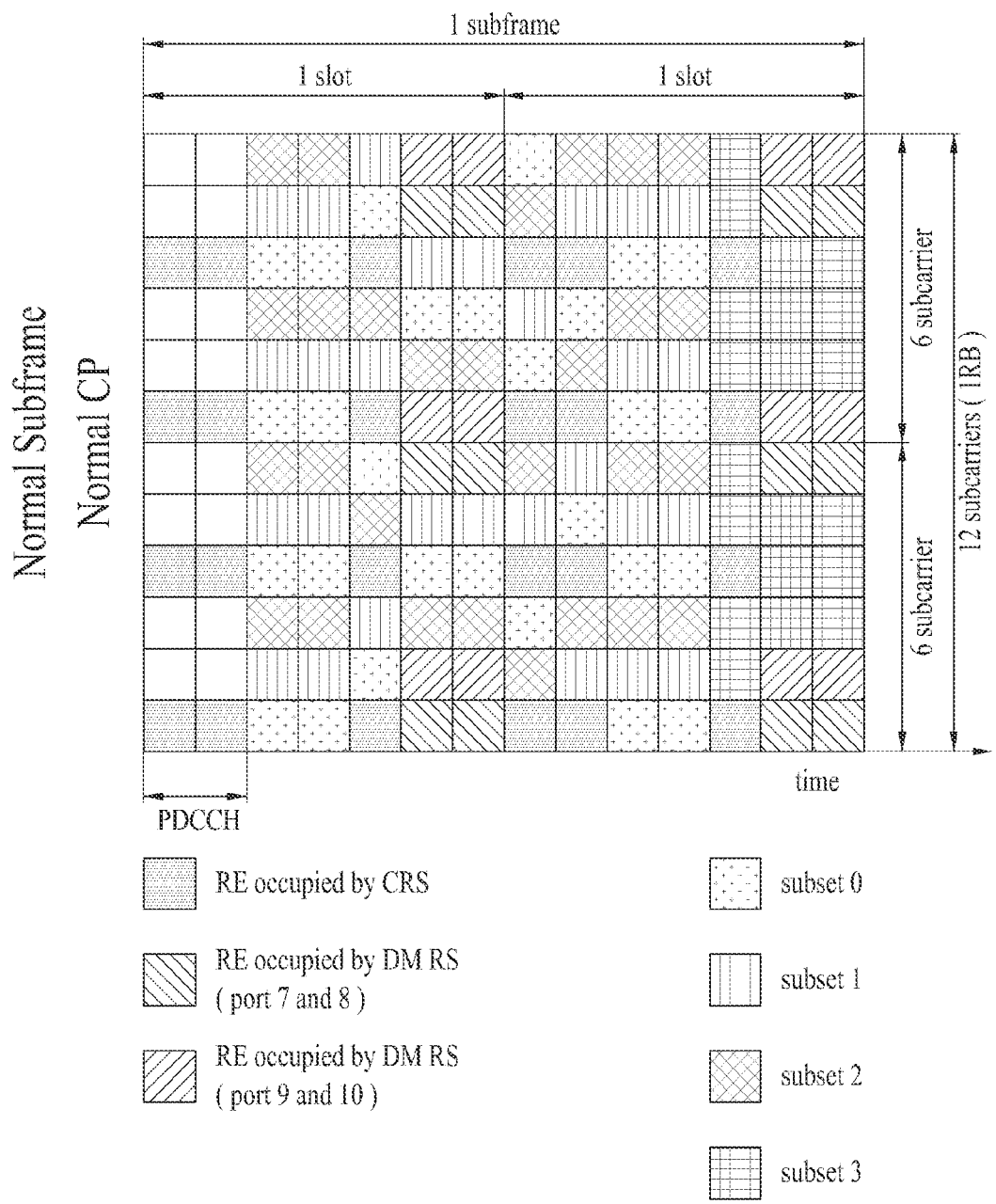

FIGS. 12 and 13 illustrate E-PDCCH resource mapping according to another embodiment of the present invention.

The E-PDCCH resource mapping schemes described above with reference to FIGS. 9, 10 and 11 are based on the assumption that the number of OFDM symbols available for E-PDCCH transmission within one subframe is not limited by the legacy-PDCCH.

FIGS. 12 and 13 illustrates examples in which OFDM symbols 0 and 1 are used for legacy-PDCCH transmission while E-PDCCH resource mapping is performed as in the example of FIG. 11. The example of FIG. 12 corresponds to a case in which the number of REs used for subsets 0, 1 and 2 is reduced while resource mapping for subset 3 in FIG. 11 is maintained. The example of FIG. 13 corresponds to a case in which the number of OFDM symbols allocated for subset 3 is reduced by one in order to uniformly maintain the number of REs allocated to each subset.

Figure 14:
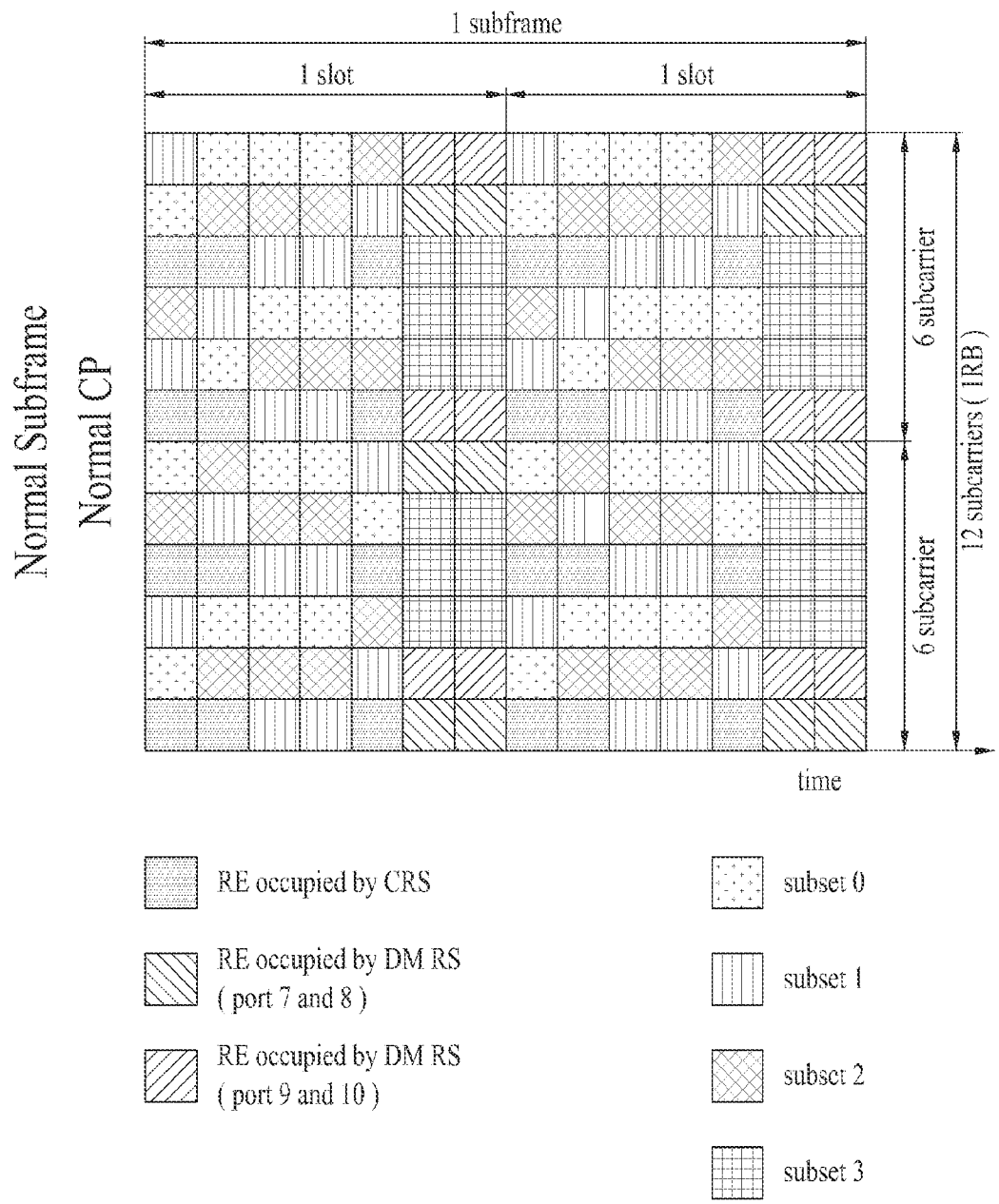
Figure 15:
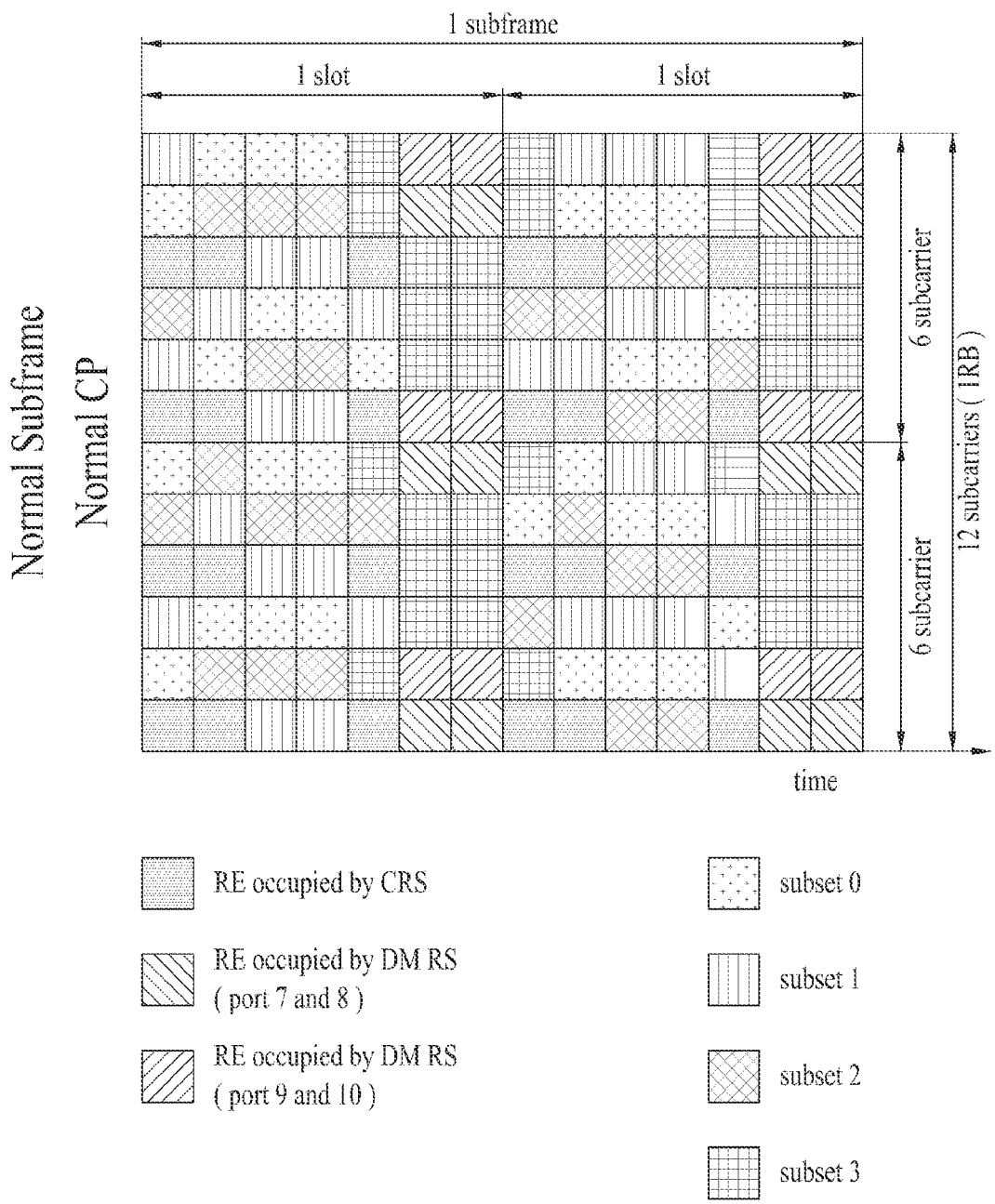

FIGS. 14 and 15 illustrate E-PDCCH resource mapping according to another embodiment of the present invention.

In the examples of FIGS. 14 and 15, a specific E-PDCCH RE subset may be mapped to only REs of OFDM symbols having DMRSs in order to minimize an error of a channel estimated using a DMRS. For example, an E-PDCCH subset for a UE having high mobility may be configured only using OFDM symbols (e.g. OFDM symbols 5, 6, 12 and 13 in FIG. 8) having DMRSs. In the example of FIG. 14, subset 3 can be mapped to REs corresponding to OFDM symbols 5, 6, 12 and 13 and subsets 0, 1 and 2 can be sequentially mapped to the remaining REs.

The example of FIG. 14 differs from the example of FIG. 11 in that subset 3 is composed of 24 REs corresponding to OFDM symbols 5, 6, 12 and 13. This E-PDCCH mapping scheme can be used to correctly transmit an E-PDCCH when CRS related configuration is ambiguous since a subset composed of a predetermined number of REs in specific positions can be generated irrespective of CRS related configuration (e.g. whether an MBSFN subframe is set, the number of CRS ports, etc.) in a specific subframe. For example, when an E-PDCCH RE subset composed of only REs corresponding to DMRS transmission OFDM symbols is used for an E-PDCCH on which DCI format 1A (i.e. basic downlink allocation information) for fallback or DCI format 0 (i.e. basic uplink grant information) is transmitted, basic scheduling information can be provided to the UE in a corresponding position without affecting other configurations.

In the case of remaining subsets, since the number and/or positions of REs occupied by each subset may be changed according to other configurations (e.g. CRS related configuration), E-PDCCH resource mapping can be performed more flexibly.

The example of FIG. 15 relates to a method for increasing the number of REs of an E-PDCCH RE subset robust against UE mobility by additionally allocating REs adjacent to DMRS transmission OFDM symbols for a specific subset. As shown in FIG. 15, REs (12 REs resulted from 4 REs per OFDM symbol) closest to DMRS transmission REs from among REs corresponding to OFDM symbols 4, 7 and 11 can be additionally allocated as REs of subset 3.

In this case, since the number of REs allocated to a specific subset (e.g., subset 3) composed of REs corresponding to DMRS transmission OFDM symbols and REs adjacent thereto is 36 which equals the number of REs belonging to one CCE of a legacy-PDCCH, the principle of configuration of a search space, an aggregation level, etc. for the legacy-PDCCH can be applied without being changed.

When E-PDCCH resource mapping is performed according to the aforementioned examples of the present invention, if a subset is not used for E-PDCCH transmission, then REs of the subset may be used for PDSCH transmission. In this case, REs of a subset in which an E-PDCCH with respect to a UE is not transmitted can be used for PDSCH transmission for the purpose of smooth downlink resource allocation only when the E-PDCCH on which downlink allocation information about the UE is transmitted and a PDSCH scheduled by the downlink allocation information are transmitted within the same PRB pair. This is because the UE can be aware of a subset used for E-PDCCH transmission and a subset used for PDSCH transmission in the corresponding PRB pair without additional signaling.

Method for Setting Basic Unit of Enhanced Control Channel Transmission

In the aforementioned resource mapping schemes for the enhanced control channel, the principle of the present invention has been described by exemplifying E-PDCCH transmission in one PRB pair, and the examples with respect to the E-PDCCH can be equally applied to other control channels (e.g. E-PHICH, E-PCFICH) as described above.

A description will be given of a method for setting a basic unit of enhanced control channel transmission on the basis of the aforementioned various RE setting schemes for enhanced control channel transmission.

It is assumed that an enhanced control channel is composed of one or more REGs and one or more REGs constitute one enhanced control channel RE subset (e.g. E-PDCCH RE subset in the aforementioned examples) described in the present invention. If a plurality of REGs is used to transmit one enhanced control channel, then the REGs may be transmitted in different PRB pairs for frequency diversity.

Here, an enhanced control channel RE subset may correspond to the aforementioned ECCEs and REGs constituting the enhanced control channel RE subset may correspond to the aforementioned EREGs. While the principle of the present invention will be described based on the enhanced control channel RE subset and REG for clarity in the following, these terms may be replaced by ECCE and EREG.

When the specific subset (e.g. subset 3) is composed of only REs corresponding to OFDM symbols having DMRSs in the example of FIG. 14, since REs in specific positions (i.e. DMRS transmission OFDM symbols) can be used for enhanced control channel transmission irrespective of other configurations (e.g. the number of CRS ports, etc.) with respect to the corresponding subframe and the specific positions are close to DMRSs, a correct channel estimation value can be efficiently used. Accordingly, it is effective to use the specific subset for an enhanced control channel transmitted to a plurality of UEs.

A description will be given of a method for configuring REGs suitable for an enhanced control channel mapped to a specific position related to positions of DMRS transmission REs.

FIGS. 16 to 19 illustrate examples of REG configurations of the enhanced control channel according to the present invention. In FIGS. 16 to 19, enhanced control channel RE subset 3 shown in FIG. 14 is exemplified for clarity and resource mapping with respect to subsets 0, 1 and 2 is not shown.

Figure 16:
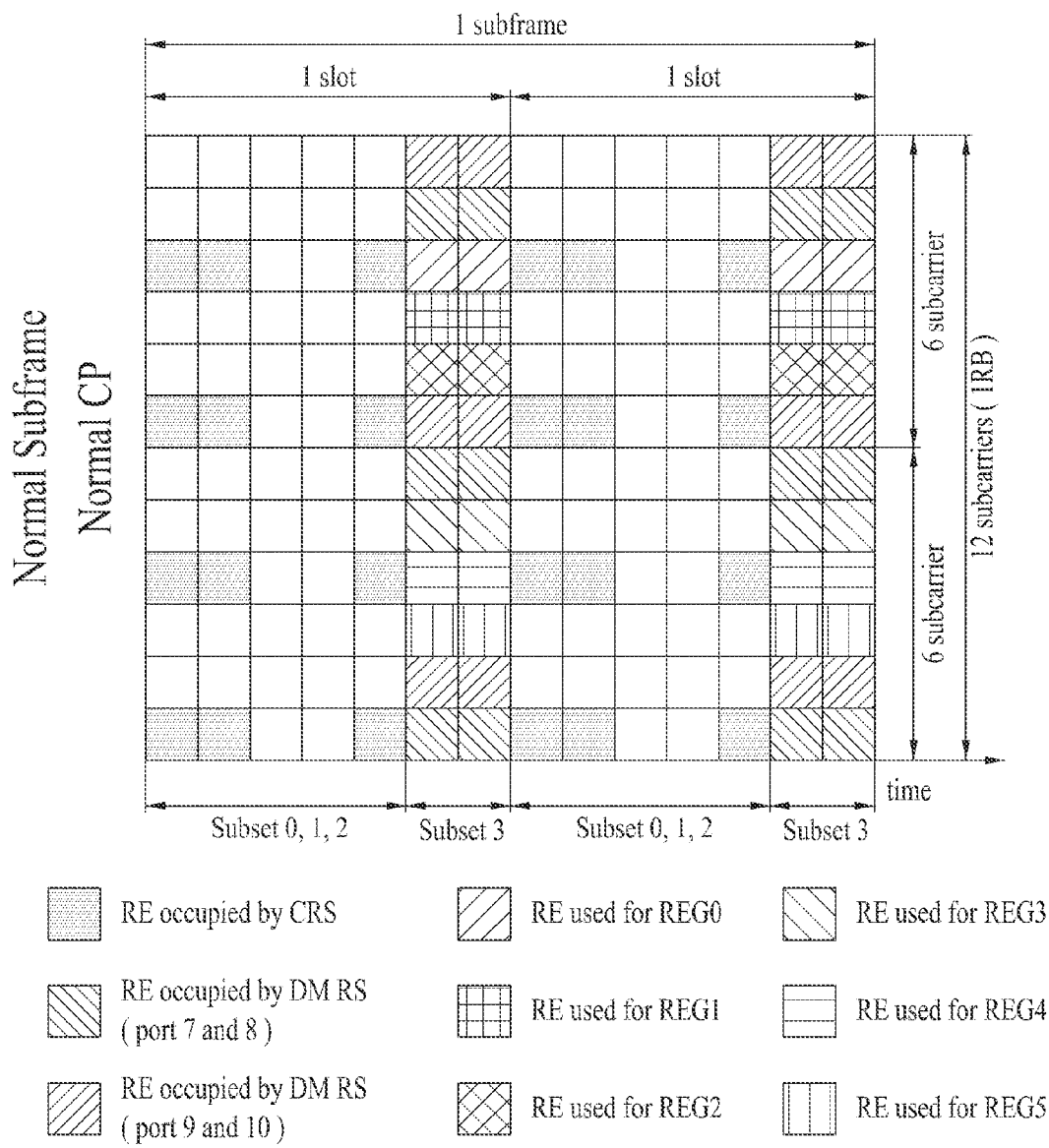
FIGS. 16 to 19 illustrate exemplary REG configurations of an enhanced control channel according to the present invention.

FIG. 16 illustrates a case in which 4 REs corresponding to the same subcarrier from among REs (i.e. REs other than DMRS REs from among REs corresponding to DMRS transmission OFDM symbols) corresponding to subset 3 constitute one REG. Accordingly, a total of 6 REGs (i.e. REG0 to REG5) can be configured within one PRB pair for one enhanced control channel subset. Referring to FIG. 16, REG0 can be composed of 4 REs corresponding to subcarrier index 9, REG1 can be composed of 4 REs corresponding to subcarrier index 8, REG2 can be composed of 4 REs corresponding to subcarrier index 7, REG3 can be composed of 4 REs corresponding to subcarrier index 6, REG4 can be composed of 4 REs corresponding to subcarrier index 5 and REG5 can be composed of 4 REs corresponding to subcarrier index 4 on DMRS transmission OFDM symbols.

Figure 17:
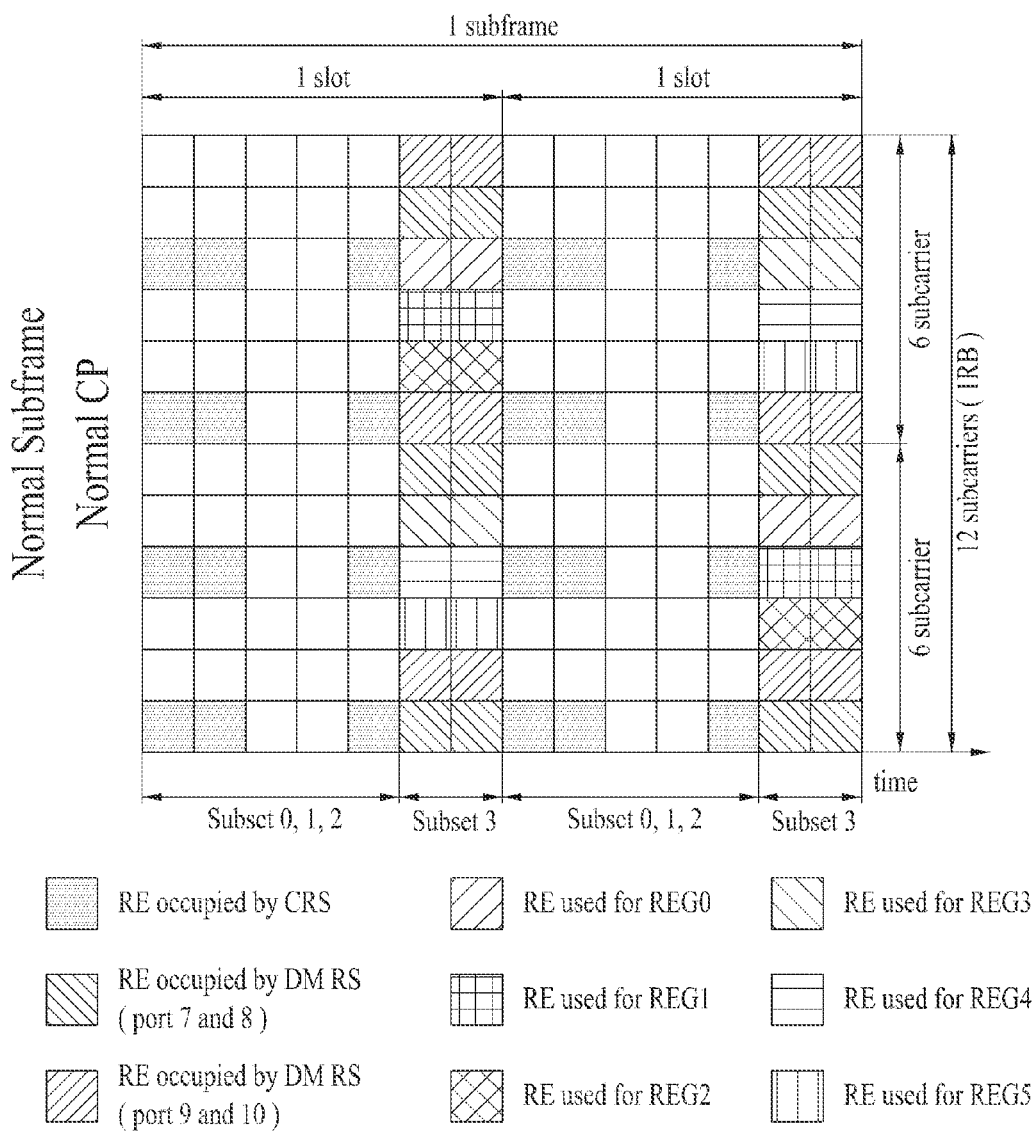

FIG. 17 illustrates a modification of the REG configuration method shown in FIG. 16 in order to provide time diversity. For example, a subcarrier position to which an REG is mapped in the first slot within one PRB pair can differ from a subcarrier position to which the REG is mapped in the second slot. FIG. 17 shows that a subcarrier position to which an REG is mapped in the second slot is shifted by a circular offset of 6 from a subcarrier position to which the REG is mapped in the first slot. However, the scope of the present invention is not limited thereto and includes a case in which an RE corresponding to an REG in the first slot and an RE corresponding to the REG in the second slot are shifted by various offset values.

As a modification of FIGS. 16 and 17, one REG can be composed of only two REs corresponding to the same subcarrier on two neighboring OFDM symbols in each slot. Accordingly, a total of 12 REGs can be defined for one enhanced control channel subset within one PRB pair. This REG configuration method is advantageous in a case in which grouping of REs corresponding to OFDM symbols spaced apart in the time domain into one REG is not appropriate when a channel for a specific UE rapidly changes.

Figure 18:
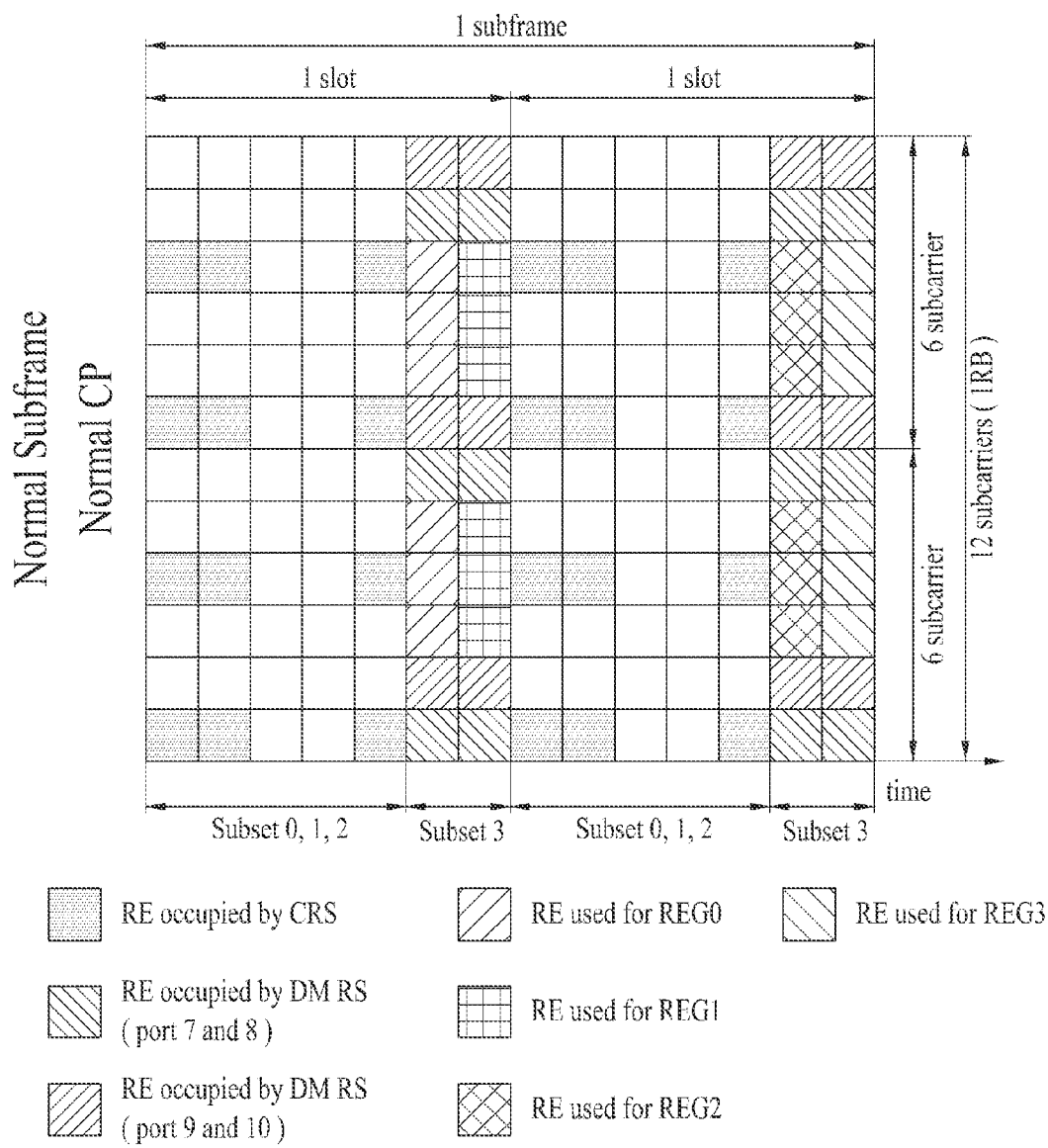

FIG. 18 illustrates an example in which one REG is composed of 6 REs. Accordingly, a total of 4 REGs can be configured within one PRB pair for one enhanced control channel subset. Referring to FIG. 18, one REG can be composed of REs corresponding to the same OFDM symbol. This REG configuration method is advantageous when a channel for a UE rapidly changes.

Figure 19:
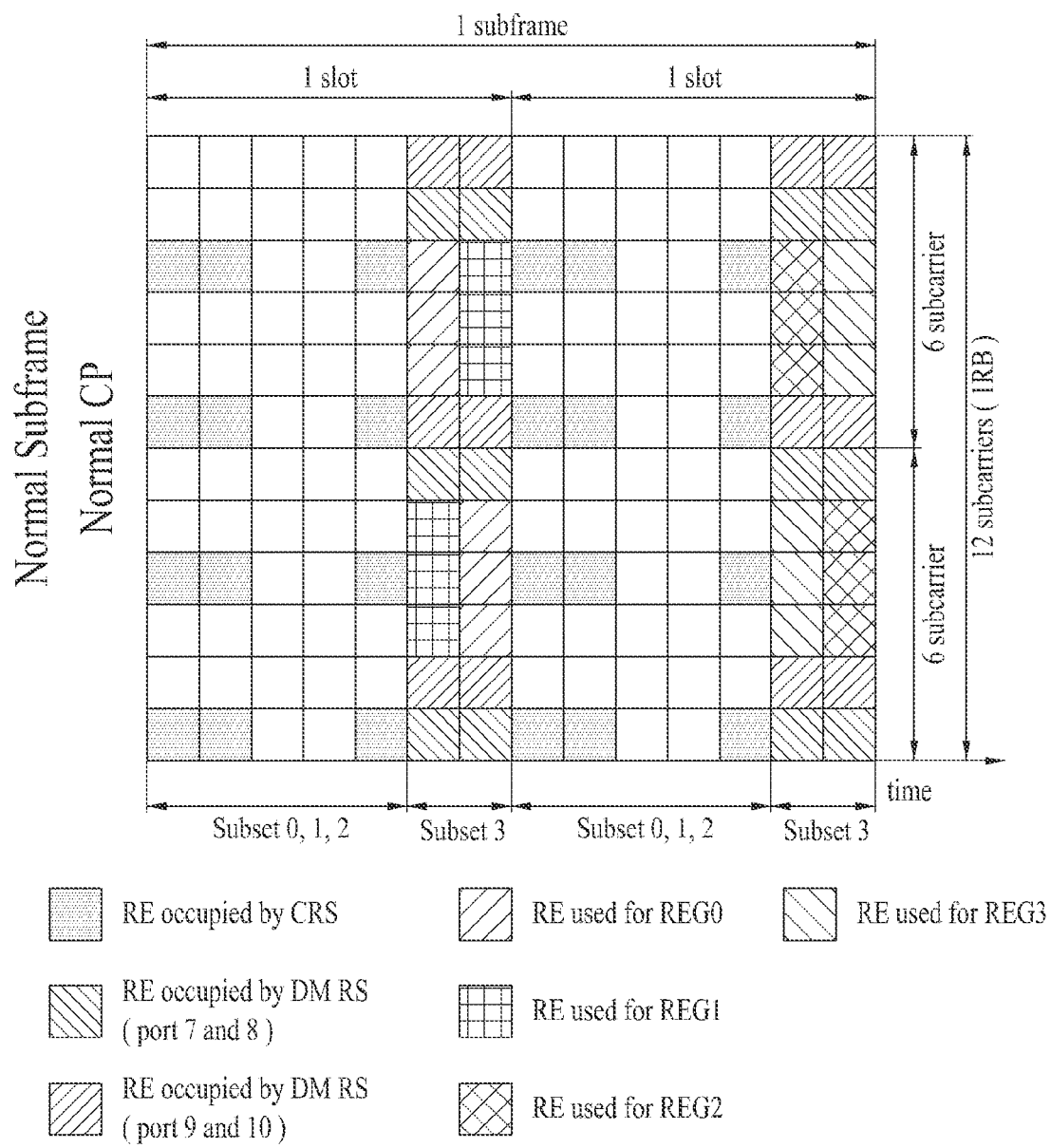

FIG. 19 illustrates a modification of FIG. 18, in which one REG is composed of 3 REs of each of two OFDM symbols rather than corresponding to one OFDM symbol. When one REG corresponds to only one OFDM symbol, transmit power of a specific OFDM symbol and transmit power of other OFDM symbols may not be balanced. However, according to the example of FIG. 19 in which one REG corresponds to two OFDM symbols, a transmit power difference between OFDM symbols can be minimized.

In addition, according to a modification of the methods shown in FIGS. 18 and 19, one REG may be composed of 3 neighboring REs corresponding to one OFDM symbol. Accordingly, a total of 8 REGs can be defined within one PRB pair for one enhanced control channel subset. According to this REG configuration method, a single enhanced control channel can be transmitted in a larger number of PRB pairs by setting the size of a single REG to less than 6 REs, thereby improving efficiency such as frequency diversity.

Method of Considering a Changed DMRS Position

There have been described the examples of determining resources to which an enhanced control channel is mapped on the basis of positions of DMRS REs and the examples of configuring REGs for the enhanced control channel.

While the above description is based on a case in which DMRS RE positions correspond to OFDM symbols 6, 7, 12 and 13 in a subframe, the DMRS RE positions are not limited thereto and may be changed according to subframe configuration.

For example, the length of DwPTS/GP/UpPTS can be varied according to configuration of a special subframe (i.e. subframe composed of DwPTS, GP and UpPTS in FIG. 1(b)) in a TDD system. Special subframe configurations can be defined as shown in Table 3.

TABLE 3

| | | Normal cyclic prefix in downlink | | | Extended cyclic prefix in downlink | | |
|---|---|---|---|---|---|---|---|
| | | | UpPTS | | | UpPTS | |
| | | Normal | | | | | |
| Special subframe configuration | DwPTS | cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 20:
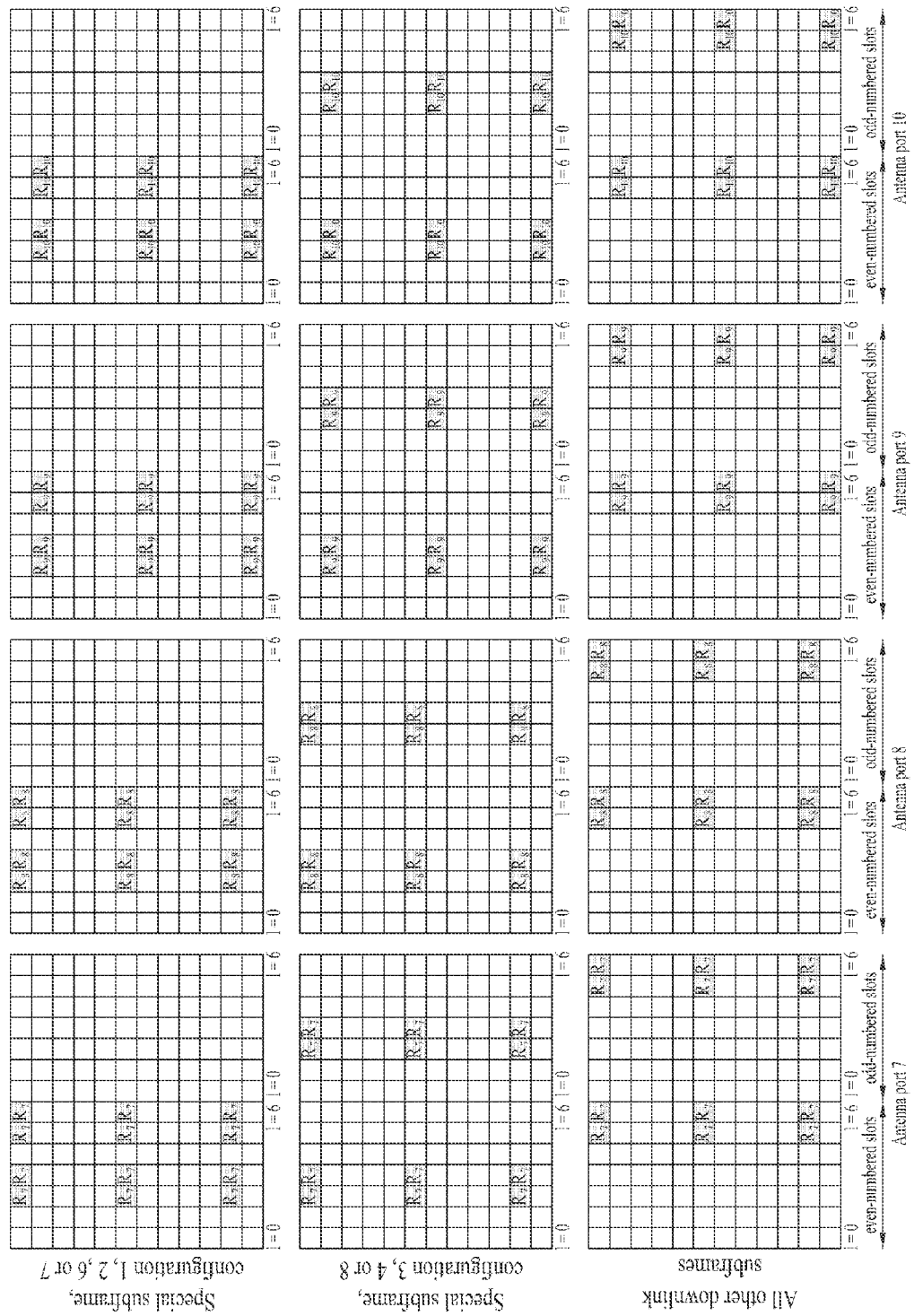
FIG. 20 illustrates DMRS positions according to subframe configuration.

FIG. 20 illustrates DMRS positions according to subframe configuration. In the case of special subframe configuration 1, 2, 6 or 7, DMRS REs are present in the first slot (i.e. even-numbered slots when the slot index starts from 0) only. In the case of special subframe configuration 3, 4, 8 or 9, DMRS positions in the first two DMRS transmission OFDM symbols correspond to the DMRS positions in special subframe configuration 1, 2, 6 or 7 and the remaining two DMRS transmission OFDM symbols are present in the second slot (i.e. odd-numbered slots). In the case of other subframe configurations including a normal subframe configuration, DMRSs are disposed at the same positions as the DMRS positions shown in FIGS. 8 to 18.

As described above, a DMRS position can be changed according to subframe configuration. In this case, the above description can be understood as determination of configuration of resources and/or REGs to which an enhanced control channel is mapped on the basis of changed DMRS RE positions. For example, while enhanced control channel RE subset 3 mapped to DMRS transmission OFDM symbols can be disposed in OFDM symbols 6, 7, 12 and 13 in the example of FIG. 14, enhanced control channel RE subset 3 may be positioned on different resources according to changed DMRS positions.

When resources to which an enhanced control channel is mapped are limited to some OFDM symbols only as in the aforementioned examples, the enhanced control channel can be transmitted irrespective of (independently of) subframe configuration. A description will be given of a method for limiting resources to which an enhanced control channel is mapped to some OFDM symbols only according to another embodiment of the present invention.

Method of Considering CRS Positions

Figure 21:
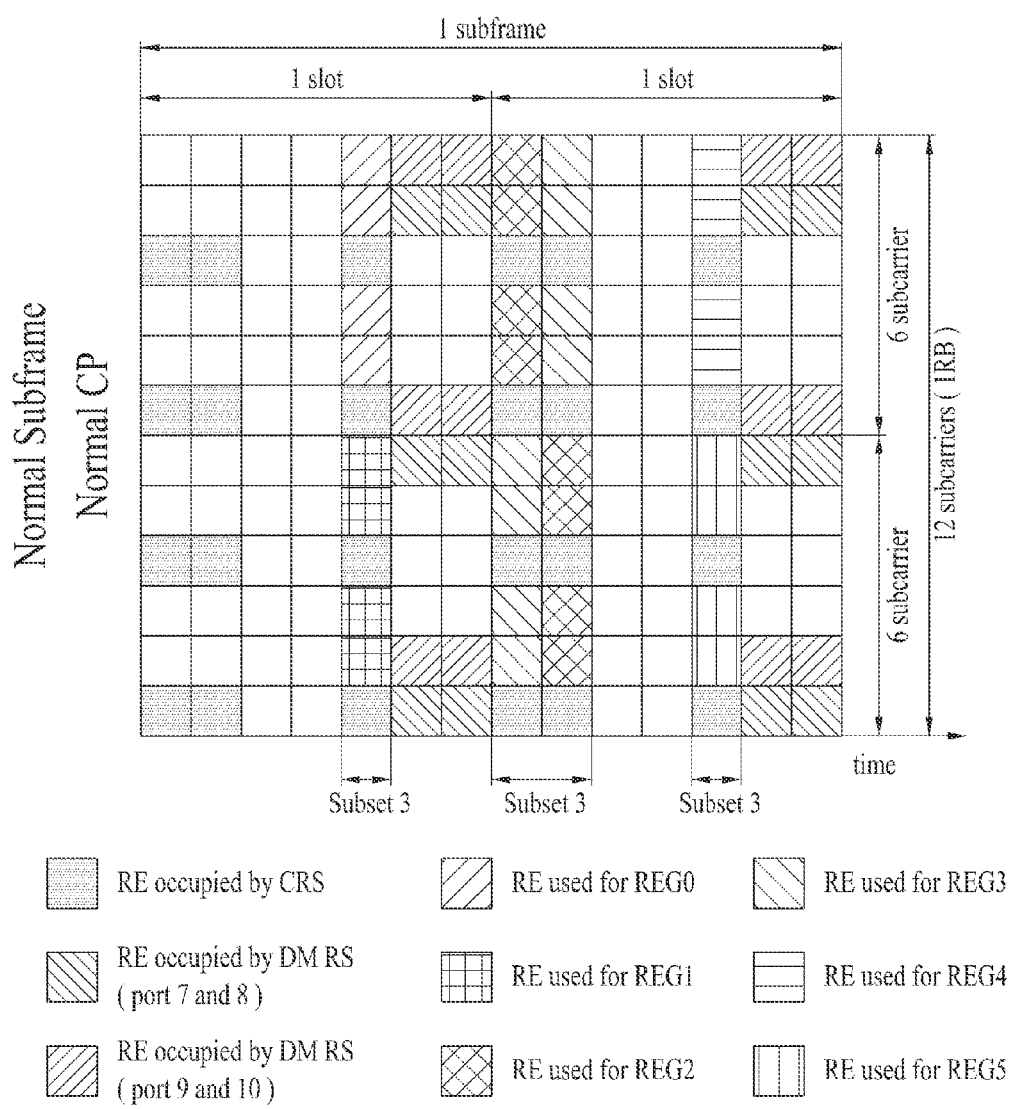
FIG. 21 illustrates another example of enhanced control channel resource mapping according to the present invention.

FIG. 21 illustrates a method for mapping an enhanced control channel to resources according to another embodiment of the present invention.

In FIG. 21, a specific subset (e.g. subset 3 as in the examples of FIGS. 9 to 19) from among enhanced control channel RE subsets is composed of REs corresponding to OFDM symbols in which CRSs are transmitted. The REs corresponding to the specific subset are determined based on DMRS transmission REs in the examples of FIGS. 9 to 19 whereas the REs corresponding to the specific subset are determined based on CRS transmission REs in the example described with reference to FIG. 21.

FIG. 21 shows that the enhanced control channel RE subset is mapped to OFDM symbols 4, 7, 8 and 11 in which CRSs are transmitted. It is assumed that the enhanced control channel RE subset is not defined for OFDM symbols 0 and 1 in consideration of a case in which OFDM symbols 0 and 1 are used for legacy-PDCCH transmission. No other RSs (e.g. DMRS, CSI-RS, etc.) are present in OFDM symbols in which CRSs are present. Accordingly, REs in predetermined positions can be allocated for enhanced control channel transmission irrespective of RS configuration of each subframe. Even if a CRS is not present in a corresponding OFDM symbol according to MBSFM subframe configuration or extension carrier configuration, the enhanced control channel RE subset can be configured on the assumption that CRSs of all antenna ports are present in order to uniformly maintain the position of the enhanced control channel RE subset in all cases.

FIG. 21 illustrates an example of configuring two REGs per OFDM symbol. Accordingly, a total of 6 REGs can be defined within one PRB pair for one enhanced control channel subset.

Various modifications are applicable to the method for determining enhanced control channel transmission REs on the basis of CRS transmission REs. For example, 4 REs corresponding to the same subcarrier in different OFDM symbols may constitute one REG. In addition, one REG may be configured in such a manner that the REG is shifted by a predetermined frequency offset relative to the slot boundary.

Method for Setting the Number of PRB Pairs Configured for Enhanced Control Channel Transmission As shown in Table 3, some OFDM symbols may not be transmitted in a special TDD subframe when the length of DwPTS is reduced. In this case, an REG is not defined in the corresponding OFDM symbols and an enhanced control channel using the REG can be transmitted using an REG of a neighboring PRB pair configured to transmit the enhanced control channel. Here, in order to maintain the number of REGs used for the enhanced control channel, enhanced-control channel transmission may be set in a larger number of PRB pairs in a subframe in which the number of available OFDM symbols is reduced.

For example, the eNB can set a group of PRB pairs that can transmit the enhanced control channel per subframe and signal information about setting of the PRB pairs to a UE. If all 4 OFDM symbols (i.e. OFDM symbols 4, 7, 8 and 11) allocated to subset 3 can be used for downlink transmission as in a normal subframe in the example of FIG. 21, then a total of 32 REs in one PRB pair can be allocated to one enhanced control channel RE subset. When downlink transmission cannot be performed in the last OFDM symbol (i.e. OFDM symbol 11) from among the 4 OFDM symbols to which subset 3 can be allocated in the example of FIG. 21 as in special TDD subframe configuration 1, a total of 24 REs in one PRB pair can be allocated to one enhanced control channel RE subset. In this case, if an enhanced control channel can be transmitted using M PRB pairs when 32 REs are available in one PRB pair, then the enhanced control channel can be transmitted using M*4/3(=M*32/24) PRB pairs when 24 REs are available in one PRB pair in order to maintain the number of REs allocated to the enhanced control channel.

Method of Considering TDD UL-DL Configuration

A UE may operate such that the UE does not transmit ACK/NACL for a PUSCH in a specific downlink subframe according to uplink HARQ operation thereof. Table 4 shows TDD UL-DL configurations and Table 5 shows PHICH transmission timing.

TABLE 4

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 5

| UL/DL configuration | SF#0 | SF#1 | SF#2 | SF#3 | SF#4 | SF#5 | SF#6 | SF#7 | SF#8 | SF#9 |
|---|---|---|---|---|---|---|---|---|---|---|
| 0 | | | 6 | 0 | 0 | | | 1 | 5 | 5 |
| 1 | | | 6 | 9 | | | | 1 | 4 | |
| 2 | | | 8 | | | | | 3 | | |
| 3 | | | 8 | 9 | 0 | | | | | |
| 4 | | | 8 | 9 | | | | | | |
| 5 | | | 8 | | | | | | | |
| 6 | | | 6 | 9 | 0 | | | 1 | 5 | |

In Table 4, D denotes a downlink subframe, S denotes a special subframe and U denotes an uplink subframe. Table 5 shows a DL subframe in which HARQ ACK/NACK for a PUSCH transmitted in each UL subframe is transmitted through a PHICH per TDD UL/DL subframe. For example, a PHICH with respect to a PUSCH transmitted in UL subframe SF#2 is transmitted DL subframe SF#6 in the case of UL/DL configuration 1 (here, a special subframe is represented as a DL subframe since downlink transmission can be performed in the special subframe). As shown in Table 5, some DL subframes are irrelevant to PHICH transmission. For example, a PHICH is not transmitted in SF#0 and SF#5 in the case of UL/DL configuration 1.

It is possible to consider a case in which a UE is configured to receive a PHICH (i.e. legacy-PHICH) in a specific subframe and to receive an E-PHICH in another specific subframe. That is, the legacy-PHICH and the E-PHICH may not be transmitted in the same subframe. In this case, it can be assumed that the E-PHICH is not present in a subframe in which the legacy-PHICH present in a legacy-PDCCH region (control region of FIG. 3) is received. Accordingly, the UE can operate on the assumption that the E-PHICH is not present within a PRB pair configured for E-PHICH transmission for a subframe which can be assumed to transmit no E-PHICH.

A description will be given of an exemplary operation proposed by the present invention. In the following description, a subframe in which the E-HICH can be present is referred to as a first subframe and a subframe in which the E-PHICH is not present is referred to as a second subframe.

For example, when the E-PHICH and a PDSCH are multiplexed in the same PRB pair, the UE can assume the following for PDSCH detection. First of all, the UE can assume that the PDSCH is not mapped to an RE subset configured for the E-PHICH and an RE transmitting a DMRS used for E-PHICH demodulation in the first subframe in which the E-PHICH can be present. In addition, the UE can assume that the PDSCH is mapped to all REs except for RSs in the second subframe in which the E-PHICH is not present. Similarly, when the eNB maps the PDSCH to REs, the eNB may map the PDSCH to REs other than E-PHICH REs in the first subframe in which the E-PHICH can be present and map the PDSCH in the second subframe in which the E-PHICH is not present without considering the E-PHICH REs.

When the E-PHICH and an E-PDCCH are multiplexed in the same PRB pair, the E-PDCCH can be mapped to REs other than REs in which the E-PHICH can be present in the first subframe. In the second subframe in which the E-PHICH is not present, the E-PDCCH can be mapped without considering REs configured for E-PDCCH transmission in the first subframe. When the UE attempts to detect the E-PDCCH, the UE can detect the E-PDCCH on the assumption that the E-PDCCH is mapped to REs other than the E-PHICH REs in the first subframe in which the E-PHICH can be present and detect the E-PDCCH on the assumption that the E-PDCCH is mapped without considering the E-PHICH REs in the second subframe in which the E-PHICH is not present.

Figure 22:
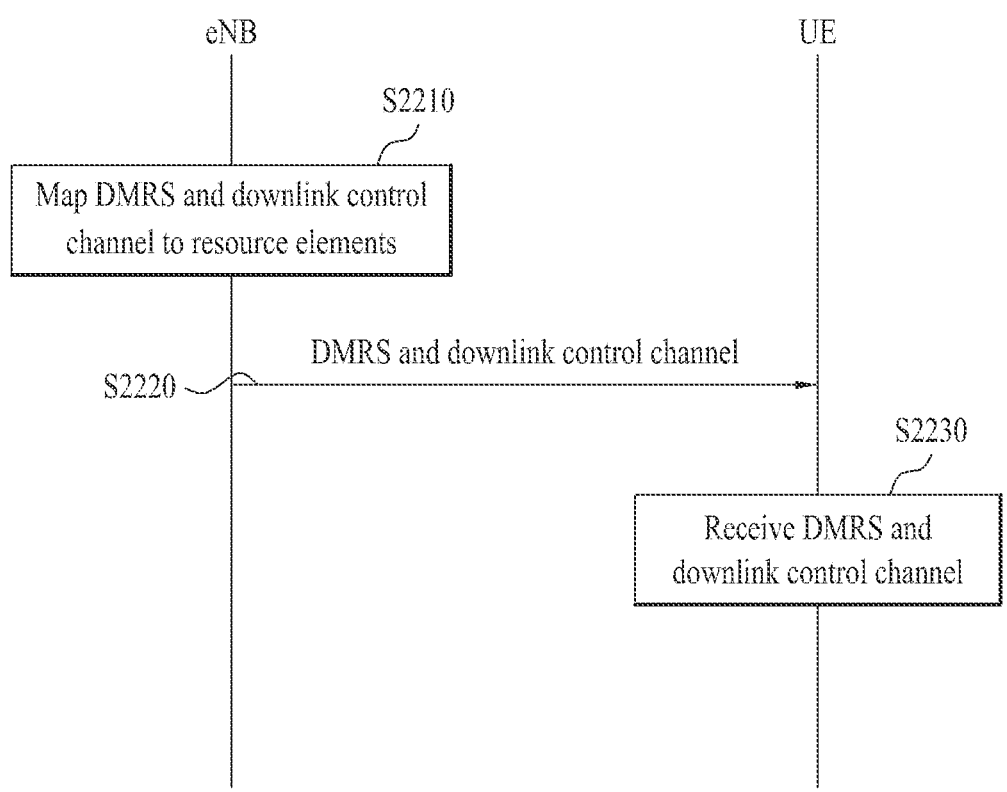
FIG. 22 is a flowchart illustrating a method for transmitting and receiving an enhanced control channel according to an embodiment of the present invention.

FIG. 22 is a flowchart illustrating a method for transmitting and receiving an enhanced control channel according to an embodiment of the present invention.

An eNB may determine REs to be used for RS (e.g. DMRS) transmission and REs to be used for enhanced control channel transmission and map a DMRS and an enhanced control channel to the determined REs. Here, a specific subset from among RE subsets used for enhanced control channel transmission may be disposed in positions of DMRS transmission REs or neighboring positions in step S2210.

The eNB may transmit the DMRS and the enhanced control channel mapped to the REs to a UE in step S2220.

The UE may receive the DMRS and the enhanced control channel from the eNB in step S2230. When the UE receives the enhanced control channel, the UE may detect the enhanced control channel on the basis of information and/or assumption about resource mapping configuration and REG configuration of the enhanced control channel.

The above-described embodiments of the present invention can be independently applied or two or more embodiments can be simultaneously applied and description of redundant parts is omitted for clarity.

In description of the various embodiment of the present invention, an eNB is exemplified as a downlink transmission entity and a UE is exemplified as a downlink reception entity. However, the scope of the present invention is not limited thereto. That is, the principle of the present invention, described through the various embodiments, can be equally applied to a case in which a relay is a downlink transmission entity for performing transmission to a UE or an uplink reception entity for performing reception from the UE or a case in which a relay is an uplink transmission entity for performing transmission to an eNB or a downlink reception entity for performing reception from the eNB.

Figure 23:
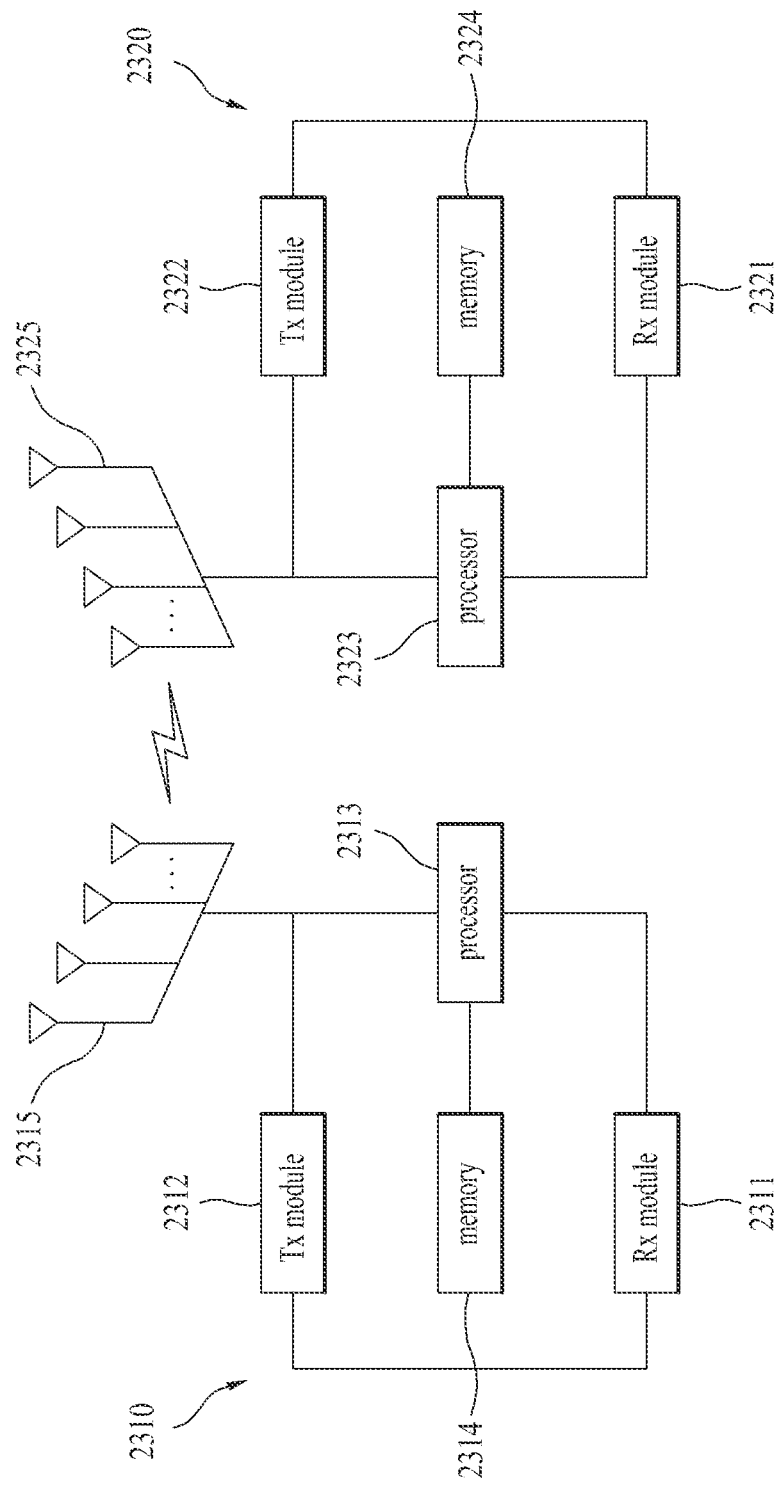
FIG. 23 illustrates configurations of a downlink transmitter and a downlink receiver according to an embodiment of the present invention.

FIG. 23 illustrates configurations of a downlink transmitter and a downlink receiver according to an embodiment of the present invention.

Referring to FIG. 23, the downlink transmitter 2310 according to an embodiment of the present invention may include a reception module 2311, a transmission module 2312, a processor 2313, a memory 2314 and a plurality of antennas 2315. The plurality of antennas 2315 refers to a downlink transmitter supporting MIMO transmission/reception. The reception module 2311 may receive signals, data and information on uplink from the downlink receiver 2320. The transmission module 2312 may transmit signals, data and information on downlink to the downlink receiver 20. The processor 2313 may control overall operation of the downlink transmitter 2310.

The downlink transmitter 2310 according to an embodiment of the present invention may be configured to transmit a downlink control channel. The processor 2313 may be configured to determine REs to which RSs are mapped. Here, RSs may be DMRSs for enhanced control channel demodulation. In addition, the processor 2313 may be configured to determine REs to which a downlink control channel is mapped. The downlink control channel may be an enhanced control channel. The processor 2313 may be configured to transmit the DMRSs and downlink control channel in the determined REs to the downlink receiver 2320 using the transmission module 2312. The REs to which the downlink control channel is mapped constitute one or more REGs which may be disposed in OFDM symbols to which the DMRSs are mapped. The one or more REGs may include REs closest to the REs to which the DMRSs are mapped. Otherwise, the one or more REGs may be positioned in OFDM symbols to which CRSs are mapped.

The processor 2313 of the downlink transmitter 2310 may process information received by the downlink transmitter 2310, information transmitted from the downlink transmitter 2310 to the outside, etc. The memory 2314 may store processed information for a predetermined time and may be replaced by a component such as a buffer (not shown).

Referring to FIG. 23, the downlink receiver 2320 according to an embodiment of the present invention may include a reception module 2321, a transmission module 2322, a processor 2323, a memory 2324 and a plurality of antennas 2325. The plurality of antennas 2325 refers to a downlink receiver supporting MIMO transmission/reception. The reception module 2321 may receive signals, data and information from the downlink transmitter 2310 and the transmission module 2322 may transmit signals, data and information to the downlink transmitter 2310. The processor 2323 may control overall operation of the downlink receiver 20.

The downlink receiver 2320 according to an embodiment of the present invention may be configured to receive a downlink control channel. The processor 2323 may be configured to determine REs to which RSs are mapped. Here, the RSs may be DMRSs for enhanced control channel demodulation. In addition, the processor 2323 may be configured to determine REs to which the downlink control channel is mapped. The downlink control channel may be the aforementioned enhanced control channel. The processor 2323 may be configured to receive the DMRSs and the downlink control channel in the determined REs from the downlink transmitter 2310 using the reception module 2321. Here, the REs to which the downlink control channel is mapped constitute one or more REGs which may be disposed in OFDM symbols to which the DMRSs are mapped. The one or more REGs may include REs closest to the REs to which the DMRSs are mapped. Otherwise, the one or more REGs may be positioned in OFDM symbols to which CRSs are mapped.

The processor 2323 of the downlink receiver 2320 may process information received by the downlink receiver 2320, information transmitted from the downlink receiver 2320 to the outside, etc. The memory 2324 may store processed information for a predetermined time and may be replaced by a component such as a buffer (not shown).

In the aforementioned configurations of the downlink transmitter 2310 and the downlink receiver 2320, the above described various embodiments of the present invention are independently applicable or two or more thereof are simultaneously applicable and redundant description is omitted for clarity.

The above description of the downlink transmitter 2310 of FIG. 23 may be equally applied to an eNB or a relay corresponding to a downlink transmitting entity or an uplink reception entity and the description of the downlink receiver 2320 of FIG. 23 may be equally applied to a UE or a relay corresponding to a downlink reception entity or an uplink transmission entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention is not intended to limit the embodiments disclosed herein but to give the broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for transmitting, by an eNB, a downlink control channel in a wireless communication system, the method comprising:
   determining a resource element (RE) to which a demodulation reference signal (DMRS) is mapped;
   determining REs to which a downlink control channel is mapped; and
   transmitting the DMRS and the downlink control channel in the determined REs to a user equipment (UE),
   wherein the REs to which the downlink control channel is mapped constitute at least one resource element group (REG), and
   wherein a distance between the RE to which the DMRS is mapped and the at least one REG is determined based on a channel state of the UE.

2. The method according to claim 1, wherein the distance is a distance between an orthogonal frequency division multiplex (OFDM) symbol to which the DMRS is mapped and an OFDM symbol to which the at least one REG is mapped,
   wherein if the UE has a worst channel state, the at least one REG of the UE is located on an orthogonal frequency division multiplex (OFDM) symbol to which the DMRS is mapped, and
   wherein otherwise, the at least one REG of the UE does not correspond to the OFDM symbol to which the DMRS is mapped.

3. The method according to claim 1, wherein the at least one REG is composed of REs corresponding to the same subcarrier in the OFDM symbol to which the DMRS is mapped.

4. The method according to claim 1, wherein the REs belonging to the at least one REG are shifted by a predetermined offset in first and second slots of a downlink subframe.

5. The method according to claim 1, wherein the at least one REG is composed of REs corresponding to the same OFDM symbol.

6. The method according to claim 1, wherein the downlink control channel includes a first downlink control channel and a second downlink control channel.

7. The method according to claim 6, wherein, when the first downlink control channel and the second downlink control channel are multiplexed in the same resource block pair, REs to which the second downlink control channel is mapped are set to REs other than REs to which the first downlink control channel is mapped.

8. The method according to claim 6, wherein the first downlink control channel carries scheduling assignment information and the second downlink control channel carries hybrid automatic repeat request (HARQ) acknowledgement information.

9. The method according to claim 6, wherein the first downlink control channel is an enhanced-physical downlink control channel (E-PDCCH) and the second downlink control channel is an enhanced-physical HARQ indicator channel (E-PHICH).

10. The method according to claim 1, wherein the downlink control channel is demodulated using a channel estimated using the DMRS.

11. The method according to claim 1, wherein the downlink control channel is disposed in OFDM symbols other than first N (N≤3) OFDM symbols of a downlink subframe.

12. The method according to claim 1, wherein the channel state of the UE comprises a mobility of the UE.

13. A method for receiving, by a user equipment (UE), a downlink control channel in a wireless communication system, the method comprising:
   determining a resource element (RE) to which a demodulation reference signal (DMRS) is mapped;
   determining REs to which a downlink control channel is mapped; and
   receiving the DMRS and the downlink control channel in the determined REs from an eNB,
   wherein the REs to which the downlink control channel is mapped constitute at least one resource element group (REG), and
   wherein a distance between the REs to which the DMRS is mapped and the at least one REG is determined based on a channel state of the UE.

14. An eNB for transmitting a downlink control channel in a wireless communication system, the eNB comprising:
   a reception module;
   a transmission module; and
   a processor,
   wherein the processor is configured to:
      determine a resource element (RE) to which a demodulation reference signal (DMRS) is mapped,
      determine REs to which a downlink control channel is mapped, and
      transmit the DMRS and the downlink control channel in the determined REs to a user equipment (UE) using the transmission module,
   wherein the REs to which the downlink control channel is mapped constitute at least one resource element group (REG), and
   wherein a distance between the REs to which the DMRS is mapped and the at least one REG is determined based on a channel state of the UE.

15. A user equipment (UE) for receiving a downlink control channel in a wireless communication system, the UE comprising:
   a reception module;
   a transmission module; and
   a processor,
   wherein the processor is configured to:
      determine a resource element (RE) to which a demodulation reference signal (DMRS) is mapped,
      determine REs to which a downlink control channel is mapped, and
      receive the DMRS and the downlink control channel in the determined REs from an eNB,
   wherein the REs to which the downlink control channel is mapped constitute at least one resource element group (REG), and
   wherein a distance between the REs to which the DMRS is mapped and the at least one REG is determined based on a channel state of a user equipment (UE).

* * * * *